(12) United States Patent
Nakagawa

(10) Patent No.: US 8,144,281 B2
(45) Date of Patent: Mar. 27, 2012

(54) ELECTRO-OPTICAL DEVICE HAVING A LIGHT SHIELDING FILM WITH FIRST, SECOND, AND THIRD PORTIONS

(75) Inventor: Masashi Nakagawa, Chitose (JP)

(73) Assignee: Seiko Epson Corporation, Tokyo (JP)

( * ) Notice: Subject to any disclaimer, the term of this patent is extended or adjusted under 35 U.S.C. 154(b) by 155 days.

(21) Appl. No.: 12/175,207

(22) Filed: Jul. 17, 2008

(65) Prior Publication Data

US 2009/0040447 A1    Feb. 12, 2009

(30) Foreign Application Priority Data

Aug. 9, 2007    (JP) ................................. 2007-207644
May 27, 2008    (JP) ................................. 2008-137915

(51) Int. Cl.
*G02F 1/136* (2006.01)
*G02F 1/1343* (2006.01)
(52) U.S. Cl. .......................................... 349/44; 349/38
(58) Field of Classification Search .................... 349/44, 349/38, 39
See application file for complete search history.

(56) References Cited

U.S. PATENT DOCUMENTS

2007/0058102 A1* 3/2007 Shimizu et al. ................. 349/44

FOREIGN PATENT DOCUMENTS

| JP | 2004-151546 | 5/2004 |
|----|-------------|--------|
| JP | 2004-170911 | 6/2004 |
| JP | 2004-198849 | 7/2004 |
| JP | 2007-187964 | 7/2007 |

* cited by examiner

*Primary Examiner* — Mark Robinson
*Assistant Examiner* — Paul Lee
(74) *Attorney, Agent, or Firm* — AdvantEdge Law Group, LLC

(57) ABSTRACT

An electro-optical device includes a light-shielding portion that covers a semiconductor layer of a transistor. A first conductive film and a second conductive film are connected through a contact hole through an interlayer insulating film. The light-shielding portion has an extended portion that extends into a corner of an aperture region of each pixel corresponding to the pixel electrode. The contact hole at least partially overlaps the extended portion as viewed in plan.

17 Claims, 13 Drawing Sheets

FIG. 7
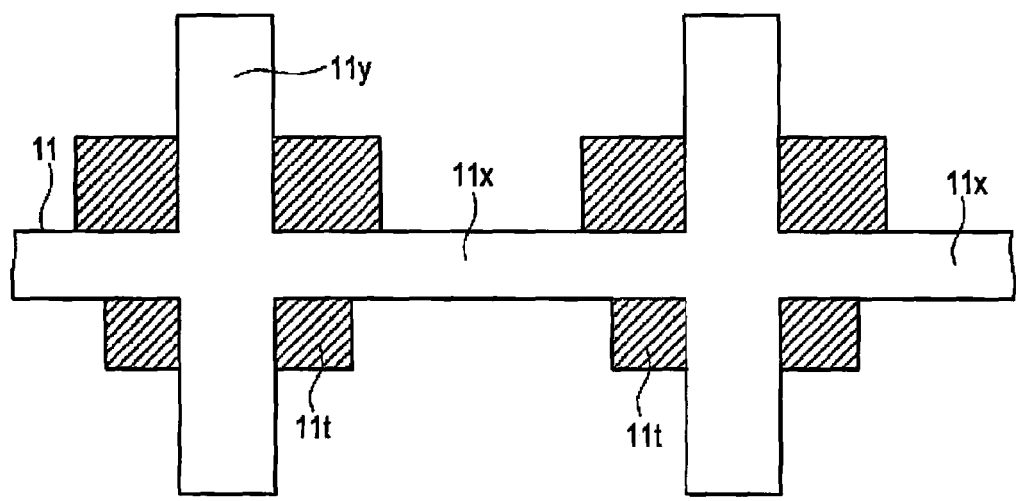
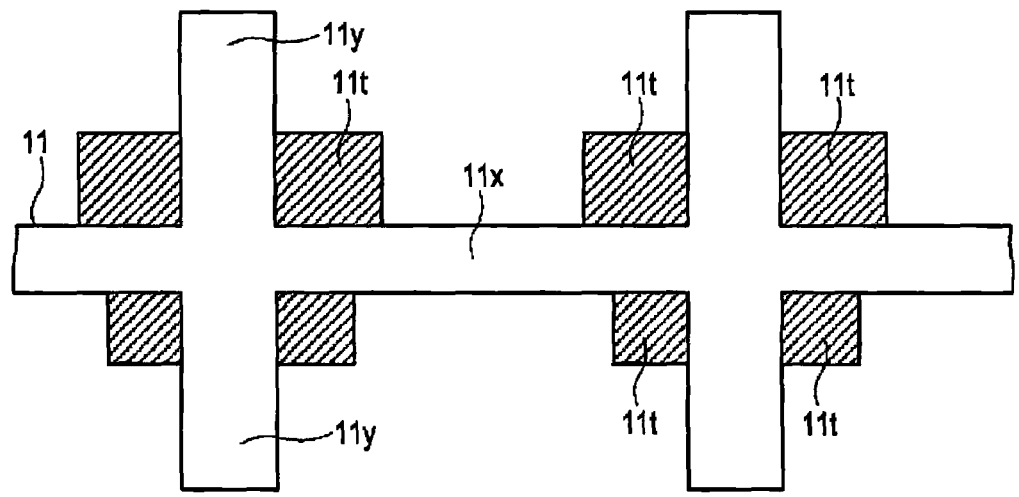
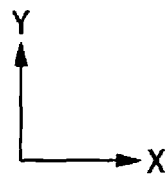

ELECTRO-OPTICAL DEVICE HAVING A LIGHT SHIELDING FILM WITH FIRST, SECOND, AND THIRD PORTIONS

BACKGROUND

1. Technical Field

The present invention relates to a technical field of an electro-optical device, such as a liquid crystal device, and an electronic apparatus, such as a liquid crystal projector, provided with the electro-optical device.

2. Related Art

A liquid crystal device, which is an example of the above electro-optical device, is also used widely, for example, as a light modulating device (light valve) of a projection-type display device. Particularly, in a projection-type display device, because intensive light emitted from a light source enters a liquid crystal light valve, a light shielding film, which serves as a light shielding device that blocks incident light, is installed in the liquid crystal light valve so that a thin film transistor (TFT) in the liquid crystal light valve does not cause an increase in leakage current and/or a malfunction, or the like, because of the intensive light. More specifically, in order to drive a pixel electrode in each pixel, such a light shielding film is at least partially formed of a vertical data line and a horizontal scanning line, which are arranged in a display area so as to intersect with each other, and a conductive film that constitutes various electronic elements, or the like, including a TFT, which are electrically connected to the scanning line and/or the data line in each pixel. Alternatively, in addition to or in place of this configuration, to merely serve as a light shielding device that blocks incident light, a light shielding film is formed into a grid-like or stripe pattern that corresponds to the planar pattern shape of the data lines and the scanning lines.

In a region on a substrate, in which the light shielding film is formed, that is, a non-aperture region that does not transmit light, contact holes that electrically connect the TFT to the pixel electrode are formed in an interlayer insulating film that electrically insulates the pixel electrode from an electronic element, such as various wirings and the TFT, formed on the lower layer side below the pixel electrode (which is, for example, described in JP-A-2004-198849).

However, there is a technical problem that in order to implement a high-definition electro-optical device or miniaturized pixel pitch in consistent with a general request that a high-quality display image, and in order to attain a high aperture ratio of each pixel to display a bright image, if the width of a light shielding film provided between mutually adjacent pixels is merely reduced, light may be more likely to enter TFTs, that is, light shielding ability for TFTs may decrease. Furthermore, there is another technical problem that if the width of such a light shielding film is merely reduced, it will be difficult to ensure space for providing contact holes in the non-aperture region in terms of manufacturing process or design.

SUMMARY

An advantage of some aspects of the invention is that it provides an electro-optical device that enhances light shielding property for transistors, that is able to improve the aperture ratio and that is able to display a bright, high-quality image, and that it provides an electronic apparatus that is provided with the electro-optical device.

An aspect of the invention provides an electro-optical device. The electro-optical device includes a substrate, a data line, a transistor, a pixel electrode, a light shielding portion, a first conductive film, and a second conductive film. The transistor is electrically connected to the data line. The pixel electrode is provided in correspondence with the transistor. The light shielding portion is provided so as to cover a semiconductor layer of the transistor. The first conductive film is provided so as to overlap the light shielding portion, and is formed on a lower layer side below the pixel electrode and on an upper layer side above the semiconductor layer. The second conductive film is formed on an upper layer side above the first conductive film through an interlayer insulating film and is electrically connected to the first conductive film through a contact hole formed in the interlayer insulating film. The light shielding portion has an extended portion that extends into a corner of an aperture region of each pixel corresponding to the pixel electrode. The contact hole at least partially overlaps the extended portion as viewed in plan on the substrate.

According to an electro-optical device of the aspect of the invention, for example, supply of an image signal from the data line to the pixel electrode is controlled, so that an image may be displayed by means of so-called active matrix addressing.

Here, the "aperture region" according to the aspect of the invention is a region within a pixel, through which display light is substantially emitted, and, for example, the aperture region is a region in which the pixel electrode made of a transparent conductive material such as indium tin oxide (ITO) is formed and through which light is transmitted, and the region makes it possible to vary the gray scale of outgoing light, which has penetrated through an electrooptic material such as liquid crystal in accordance with a change in transmittance ratio. In other words, the "aperture region" means a region other than a non-aperture region in which light collected at a pixel is blocked by a light shielding body, such as a wiring, a light shielding film and various elements, that has a light transmittance ratio smaller than a transparent electrode, and that does not allow light to be transmitted. Here, the "non-aperture region" means a region through which light that contributes to display is not transmitted and, for example, means a region in which a light shielding body, such as an opaque wiring, an electrode, various elements, or the like, is arranged in a pixel. Note that the "aperture ratio" means a ratio of an aperture region to the size of a pixel that includes the aperture region and a non-aperture region.

The plurality of pixel electrodes are provided in a matrix in an area, which becomes a display area, on the substrate. In addition, the data line, the transistor, the first and second conductive films and other various components for driving each pixel electrode are formed in the non-aperture region.

The semiconductor layer of the transistor is, for example, formed in a crossover region at which the data line and the scanning line intersect with each other within the non-aperture region.

The first conductive film is formed on a lower layer side below the pixel electrode and on an upper layer side above the semiconductor layer. The second conductive film is formed on an upper layer side above the first conductive film through the interlayer insulating film. The first and second conductive films are electrically connected to each other through the contact hole formed in the interlayer insulating film. Note that the interlayer insulating film may be formed as a single-layer film formed of one layer or may be formed as a multi-layer film having a laminated structure formed of two or more layers.

The light shielding portion is provided so as to cover the semiconductor layer of the transistor. That is, the light shielding portion is formed in a layer (that is, on an upper layer side above or on a lower layer side below the semiconductor layer) different from the semiconductor layer so as to at least partially define the non-aperture region. Furthermore, the light shielding portion overlaps at least portion of the semiconductor layer as viewed in plan on the substrate. In other words, the light shielding portion is formed so as to cover at least portion of the semiconductor layer from the upper layer side or lower layer side thereof. Thus, incident light that would vertically or obliquely enter the semiconductor layer or return light that would enter the semiconductor layer from the lower layer side thereof may be basically blocked by the light shielding portion. Note that the "return light" includes, for example, light that is reflected on the rear face of the substrate or light that is emitted, in a double-plate projector, or the like, from another electro-optical device and that penetrates through a composite optical system. Hence, the light shielding ability for the transistor may be enhanced to thereby make it possible to further reliably reduce, for example, light leakage current in the transistor.

Note that the light shielding portion is formed as a single-layer film or multi-layer film that includes a light shielding material. The light shielding portion may be formed as a data line, may be formed as a capacitive element that is electrically connected to the transistor, or may be formed as a scanning line.

Particularly in the aspect of the invention, the light shielding portion has an extended portion that extends into a corner of the aperture region. For example, in a crossover region at which the data line and the scanning line intersect with each other, the extended portion is provided so as to extend from a corner of the aperture region toward the center of the aperture region. That is, when a rectangular aperture region is assumed as an example, the extended portion extends from a corner of the aperture region toward to the center of the aperture region so as to form a rectangular shape or a square-shape at each of the four corners of each aperture region. Thus, light that would enter the semiconductor layer provided at the crossover region may be effectively blocked by the extended portions of the light shielding portion. That is, in comparison with the case in which no extended portions are provided, when the extended portions are, for example, formed on an upper layer side above the semiconductor layer, incident light that would vertically or obliquely enter the semiconductor layer from the upper layer side thereof, diffused light and stray light based on the incident light, and the like, may be further reliably blocked by the extended portions. When the extended portions are, for example, formed in a lower layer side below the semiconductor layer, return light that would vertically or obliquely enter the semiconductor layer from the lower layer side thereof, diffused light and stray light based on the return light, and the like, may be further reliably blocked by the extended portions. That is, light shielding property for the semiconductor layer may be enhanced or reinforced by the extended portions. Hence, it is possible to, for example, further reliably reduce light leakage current in the transistor.

Furthermore, particularly in the aspect of the invention, the contact hole at least partially overlap the extended portion as viewed in plan on the substrate. That is, in the interlayer insulating film, the contact hole is formed at a position that at least partially overlaps the extended portion as viewed in plan on the substrate. Typically, within the non-aperture region, the contact hole is arranged in a region (in other words, a light shielding region that enhances light shielding property for the transistor) in which the extended portion of the light shielding portion is formed. Thus, it is possible to prevent unnecessary enlargement of the width of a region extending along the data line or a region extending along the scanning line or prevent additional unnecessary enlargement of portion of the non-aperture region in order to arrange the contact hole only, so that a further larger aperture region may be ensured for each pixel. That is, it is possible to improve the aperture ratio.

In addition, the contact hole is arranged so as to at least partially overlap the extended portion, so that it is possible to reduce light that would enter the semiconductor layer owing to the contact hole (that is, portion of the second conductive film formed inside the contact hole or a conductive portion formed inside the contact hole as a plug made of a light shielding conductive material). That is, light that would obliquely enter the semiconductor layer from the upper layer side thereof may be blocked by the contact hole.

As described above, according to the electro-optical device of the aspect of the invention, in each pixel, it is possible to enhance light shielding property for the transistor while improving the aperture ratio, and, as a result, it is possible to display a bright, high-quality image.

In the electro-optical device according to the aspect of the invention, the extended portion may be formed at each of four corners of each aperture region.

According to the above aspect, four extended portions are provided around the semiconductor layer of each transistor. Thus, light that would enter the semiconductor layer of each transistor may be further reliably blocked by the extended portions. Moreover, each contact hole may be easily arranged so as to at least partially overlap the extended portion.

In the electro-optical device according to the aspect of the invention, the second conductive film may include a metal film and may have a portion that is formed inside the contact hole.

According to the above aspect, it is possible to much further reliably reduce light that would enter the semiconductor layer of each transistor owing to the portion that is formed inside the contact hole as the portion of the second conductive film that includes a metal film.

In the electro-optical device according to the aspect of the invention, the light shielding portion may include a lower capacitor electrode and an upper capacitor electrode that are sequentially laminated from a lower layer side on the substrate, and one electrode out of the lower capacitor electrode and the upper capacitor electrode may be a capacitive element that is electrically connected to the pixel electrode.

According to the above aspect, in each pixel, an image signal supplied to the pixel electrode is supplied to one electrode out of the upper and lower capacitor electrodes of the capacitive element, so that the capacitive element may be used as a holding capacitor that temporarily holds the electric potential of the pixel electrode. Hence, in each pixel, it is possible to improve the holding characteristic that the pixel electrode is held at an electric potential corresponding to an image signal.

Furthermore, in the above aspect, the capacitive element may also be used as the light shielding portion. In comparison with the case in which another light shielding film is additionally provided, in each pixel, it is possible to simplify the configuration associated with arrangement of each of various components, such as the data line, the scanning line or the transistor.

In the above described aspect in which the light shielding portion is a capacitive element, the first conductive film may be formed to extend from the one electrode and may be electrically connected to the semiconductor layer, and the second conductive film may be electrically connected to the pixel electrode.

In this case, each of the first and second conductive films serves as a relay layer that relays electrical connection between the semiconductor layer of the transistor and the pixel electrode. Thus, it is possible to avoid a situation that it becomes difficult to connect the semiconductor layer of the transistor and the pixel electrode with a single contact hole because of a long interlayer distance therebetween. Furthermore, because the first conductive film is formed to extend from one electrode of the capacitive element, it substantially does not lead to a complex laminated structure or a complex manufacturing process.

In the above described aspect in which the light shielding portion is a capacitive element, the electro-optical device may further include a capacitor line that is formed on an upper layer side above the capacitive element and the second conductive film and that is electrically connected to the other electrode different from the one electrode out of the lower capacitor electrode and the upper capacitor electrode, the first conductive film may be formed as the other electrode, and the second conductive film may be electrically connected to the capacitor line.

In this case, the second conductive film serves as a relay layer that relays electrical connection between the other electrode (that is, first conductive film) of the capacitive element and the capacitor line. Thus, it is possible to avoid a situation that it becomes difficult to connect the other electrode of the capacitive element and the capacitor line with a single contact hole because of a long interlayer distance therebetween.

In the above described aspect in which the light shielding portion is a capacitive element, the second conductive film may be formed as a capacitor line that is electrically connected to the other electrode different from the one electrode out of the lower capacitor electrode and the upper capacitor electrode, and the first conductive film may be electrically connected to the other electrode.

In this case, the first conductive film serves as a relay layer that relays electrical connection between the capacitor line (that is, second conductive film) and the other electrode of the capacitive element. Thus, it is possible to avoid a situation that it becomes difficult to connect the capacitor line and the other electrode of the capacitive element with a single contact hole because of a long interlayer distance therebetween.

In the above described aspect in which the light shielding portion is a capacitive element, the first conductive film may be electrically connected to the semiconductor layer, and the second conductive film may be formed to extend from the one electrode and may be electrically connected to the pixel electrode.

In this case, each of the first and second conductive films serves as a relay layer that relays electrical connection between the semiconductor layer of the transistor and the pixel electrode. Thus, it is possible to avoid a situation that it becomes difficult to connect the semiconductor layer of the transistor and the pixel electrode with a single contact hole because of a long interlayer distance therebetween. Furthermore, because the second conductive film is formed to extend from one electrode of the capacitive element, it substantially does not lead to a complex laminated structure or a complex manufacturing process.

In the above described aspect in which the light shielding portion is a capacitive element, each of the upper capacitor electrode and the lower capacitor electrode may be formed of a metal film.

In this case, the capacitive element has a so-called MIM (metal-insulator-metal) structure that is formed of a lamination of a metal film, a dielectric film (insulating film) and a metal film. According to the above capacitive element, it is possible to reduce power consumed in the pair of upper and lower capacitor electrodes in accordance with various signals supplied to the pair of capacitor electrodes. In addition, in comparison with the case in which any one of the pair of capacitor electrodes is formed of a semiconductor layer, it is possible to increase a conductance in the one electrode to thereby make it possible to improve the function of the capacitive element as a holding capacitor.

Another aspect of the invention provides an electronic apparatus that is provided with the electro-optical device according to the above described aspect of the invention (including its various aspects).

According to the electronic apparatus of the aspect of the invention, because it is provided with the above described electro-optical device according to the invention, it is possible to implement various electronic apparatuses that are able to perform bright and high-quality display, such as a projection display device, a television, a cellular phone, a personal organizer, a word processor, a viewfinder-type or a direct-view-type video tape recorder, a workstation, a video telephone, a point-of-sales terminal, or a touch panel. In addition, as the electronic apparatus according to the aspect of the invention, it is possible to, for example, implement an electrophoretic device such as an electronic paper, an electron emission device such as a field emission display or a conduction electron-emitter display, and a display device that uses these electrophoretic device or the electron emission device.

The functions and other advantageous effects of the aspects of invention become apparent from the exemplary embodiments described below.

BRIEF DESCRIPTION OF THE DRAWINGS

The invention will be described with reference to the accompanying drawings, wherein like numbers reference like elements.

FIG. 7 is a plan view that shows extended portions according to the first embodiment.

DESCRIPTION OF EXEMPLARY EMBODIMENTS

Hereinafter, embodiments according to the invention will be described with reference to the accompanying drawings. In the following embodiments, a TFT active matrix addressing liquid crystal device, which has an installed driving circuit, is used as one example of an electro-optical device according to the aspects of the invention.

First Embodiment

A liquid crystal device according to a first embodiment will be described with reference to FIG. 1 to FIG. 7.

Figure 1:
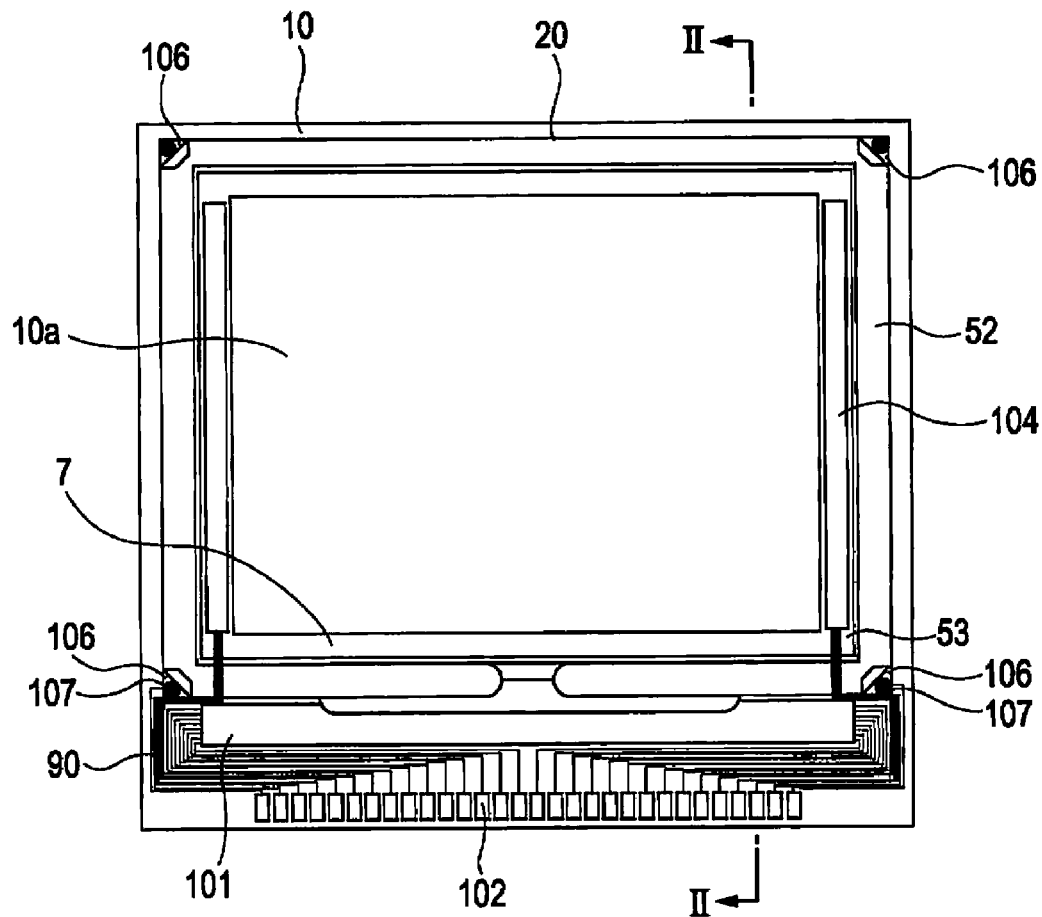
FIG. 1 is a plan view that shows the general configuration of a liquid crystal device according to a first embodiment.
Figure 2:
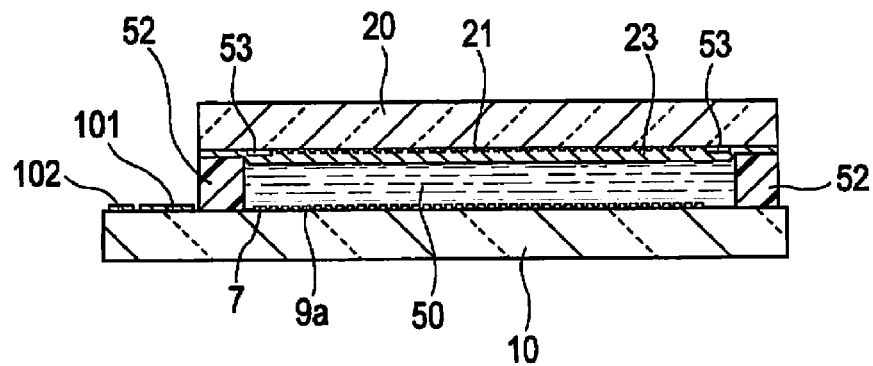
FIG. 2 is a cross-sectional view that is taken along the line II-II in FIG. 1.

The general configuration of the liquid crystal device according to the present embodiment will be described with reference to FIG. 1 and FIG. 2. FIG. 1 is a plan view that shows the general configuration of the liquid crystal device according to the present embodiment. FIG. 2 is a cross-sectional view that is taken along the line II-II in FIG. 1.

As shown in FIG. 1 and FIG. 2, in the liquid crystal device according to the present embodiment, a TFT array substrate 10 and an opposite substrate 20 are opposed to each other. The TFT array substrate 10 is a transparent substrate, such as a quartz substrate, a glass substrate, or a silicon substrate, for example. The opposite substrate 20, as well as the TFT array substrate 10, is also a transparent substrate. A liquid crystal layer 50 is sealed between the TFT array substrate 10 and the opposite substrate 20. The TFT array substrate 10 and the opposite substrate 20 are adhered to each other by a seal material 52, which is provided in a seal region located around an image display area 10a.

As shown in FIG. 1, in parallel to the inside of the seal region in which the seal material 52 is arranged, a window-frame-shaped light shielding film 53, having a light shielding property, that defines a window frame region of the image display area 10a is provided on the side of the opposite substrate 20. Within the peripheral region, in a region outside of the seal region in which the seal material 52 is arranged, a data line driving circuit 101 and an external circuit connection terminal 102 are provided along one side of the TFT array substrate 10. A sampling circuit 7 is provided inside of the seal region along the one side so as to be covered with the window-frame-shaped light shielding film 53. Scanning line driving circuits 104 are provided inside of the seal regions along two sides adjacent to the one side so as to be covered with the window-frame-shaped light shielding film 53. In addition, conductive terminals 106 are arranged on the TFT array substrate 10 at regions that are opposed to four corners of the opposite substrate 20 to electrically connect both substrates with conductive materials 107. In this manner, electrical continuity may be established between the TFT array substrate 10 and the opposite substrate 20.

A routed wiring 90 is formed on the TFT array substrate 10 to electrically connect the external circuit connection terminal 102, the data line driving circuit 101, the scanning line driving circuits 104, the conductive terminals 106, and the like.

In FIG. 2, a laminated structure in which pixel switching TFTs and wirings, such as scanning lines, data lines, and the like, are formed on the TFT array substrate 10. In the image display area 10a, pixel electrodes 9a, which are formed of a transparent material such as ITO, are provided in a matrix in the upper layer on the pixel switching TFTs and the wirings, such as the scanning lines and the data lines. An alignment layer, on which a predetermined alignment process such as rubbing process has been performed, is provided on the pixel electrodes 9a. On the other hand, a light shielding film 23 is formed on a face of the opposite substrate 20, opposite the TFT array substrate 10. The light shielding film 23 is, for example, formed of a light shielding metal film, or the like, and is patterned, for example, in a grid, or the like, in the image display area 10a on the opposite substrate 20. An opposite electrode 21, which is formed of a transparent material such as ITO, is formed, for example, in a solid manner on the light shielding film 23 so as to be opposed to the plurality of pixel electrodes 9a. Another alignment layer, on which a predetermined alignment process such as rubbing process has been performed, is formed on the opposite electrode 21. The liquid crystal layer 50 is, for example, formed of liquid crystal that is mixed with a single or multiple types of nematic liquid crystal. The liquid crystal layer 50 is made into a predetermined aligned state between a pair of these alignment layers.

Note that in the present embodiment, it is assumed that incident light that enters the liquid crystal layer 50 in the image display area 10a from the side of the opposite substrate 20 exits from the side of the TFT array substrate 10 as display light.

Although not described in the drawing, in addition to the data line driving circuit 101 and the scanning line driving circuits 104, a check circuit or check pattern for checking quality, defects, or the like, of the liquid crystal device during manufacturing or at the time of shipment, or the like, may be formed on the TFT array substrate 10.

Figure 3:
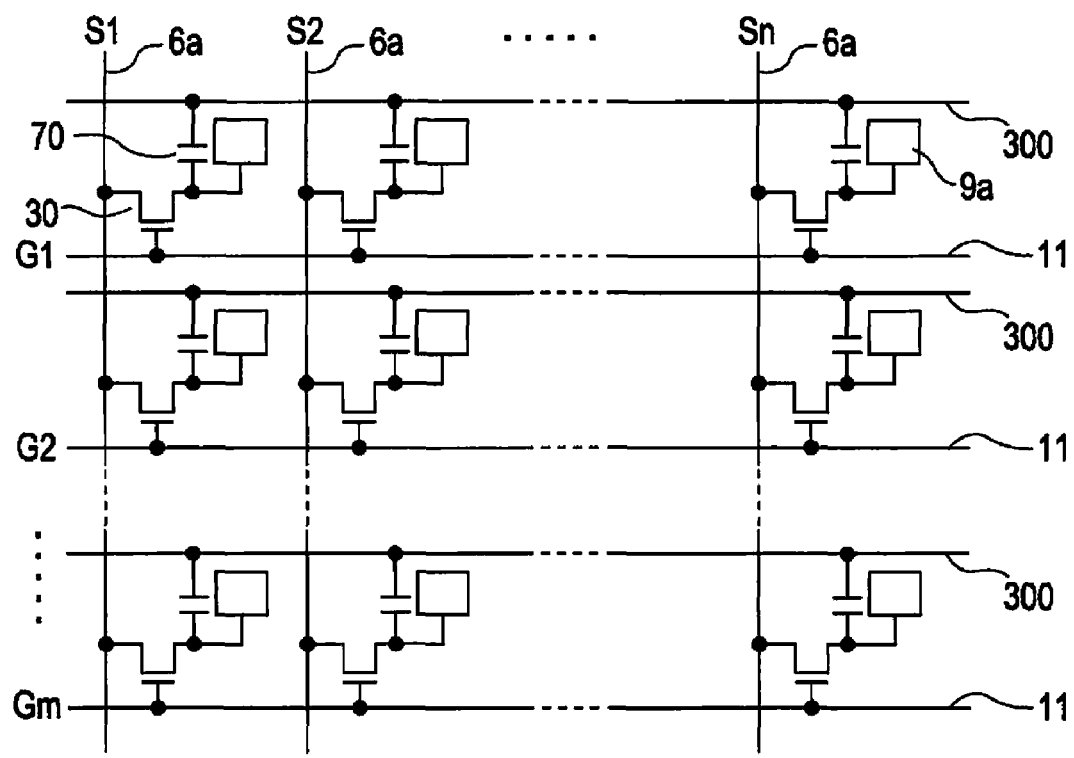
FIG. 3 is an equivalent circuit diagram of a plurality of pixel portions of the liquid crystal device according to the first embodiment.

The electrical configuration of pixel portions of the liquid crystal device according to the present embodiment will be described with reference to FIG. 3. FIG. 3 is an equivalent circuit diagram of various elements, wirings, and the like, in a plurality of pixels that are formed in a matrix and that constitute an image display area of the liquid crystal device according to the present embodiment.

In FIG. 3, the pixel electrode 9a and a TFT 30, which serves as one example of a "transistor" according to the aspects of the invention, are formed in each of a plurality of pixels that are formed in a matrix and constitute the image display area 10a. Each TFT 30 is electrically connected to the corresponding pixel electrode 9a, and controls switching of the pixel electrode 9a while the liquid crystal device is operating. Each of the data lines 6a, which are supplied with image signals, is electrically connected to the source of the corresponding TFT 30. The image signals S1, S2, . . . , Sn to be written to the data lines 6a may be supplied in line sequential in this order or may be supplied to the plurality of adjacent data lines 6a in units of group.

Each of the scanning lines 11 is electrically connected to the gate of the corresponding TFT 30. The liquid crystal device according to the present embodiment is configured to apply scanning signals G1, G2, . . . , Gm in line sequential in this order at predetermined timing to the scanning lines 11 in the form of pulse. Each of the pixel electrodes 9a is electrically connected to the drain of the corresponding TFT 30. By turning off the TFT 30, which serves as a switching element, only during a certain period, the image signals S1, S2, . . . , Sn supplied from the data lines 6a are written to the corresponding pixel electrodes 9a at predetermined timing. The image signals S1, S2, . . . , Sn of predetermined levels, written through the pixel electrodes 9a to liquid crystal, which constitutes the liquid crystal layer 50 (see FIG. 2), are held between the pixel electrodes 9a and the opposite electrode 21, which is formed on the opposite substrate 20, during a certain period of time.

Liquid crystal that constitutes the liquid crystal layer 50 modulates light to enable gray shade as alignment and/or order of molecular association is varied by an applied voltage level. In the case of a normally white mode, a transmittance ratio to incident light is reduced in accordance with an applied voltage in each pixel. In the case of a normally black mode, a transmittance ratio to incident light is increased in accordance with an applied voltage in each pixel. As a whole, light having a contrast corresponding to image signals is emitted from the liquid crystal device.

Here, in order to prevent the leakage of image signals being held, storage capacitors 70 are added so as to be in parallel with the liquid crystal capacitors that are formed between the corresponding pixel electrodes 9a and the opposite electrode 21 (see FIG. 2). Each of the storage capacitors 70 is a capacitive element that serves as a holding capacitor that temporarily holds an electric potential of the corresponding pixel electrode 9a in accordance with supply of an image signal. One of electrodes of the storage capacitor 70 is electrically in parallel with the pixel electrode 9a and is connected to the drain of the TFT 30, and the other electrode is connected to a capacitor line 300 having a fixed electric potential so as to be applied with a constant electric potential. Owing to the storage capacitor 70, electric potential holding characteristic is improved in the pixel electrode 9a, and it is possible to improve contrast and to improve display characteristics, such as a reduction in flicker. Note that the storage capacitor 70, as will be described later, also serves as an internal light shielding film that blocks light entering the TFT 30.

Figure 4:
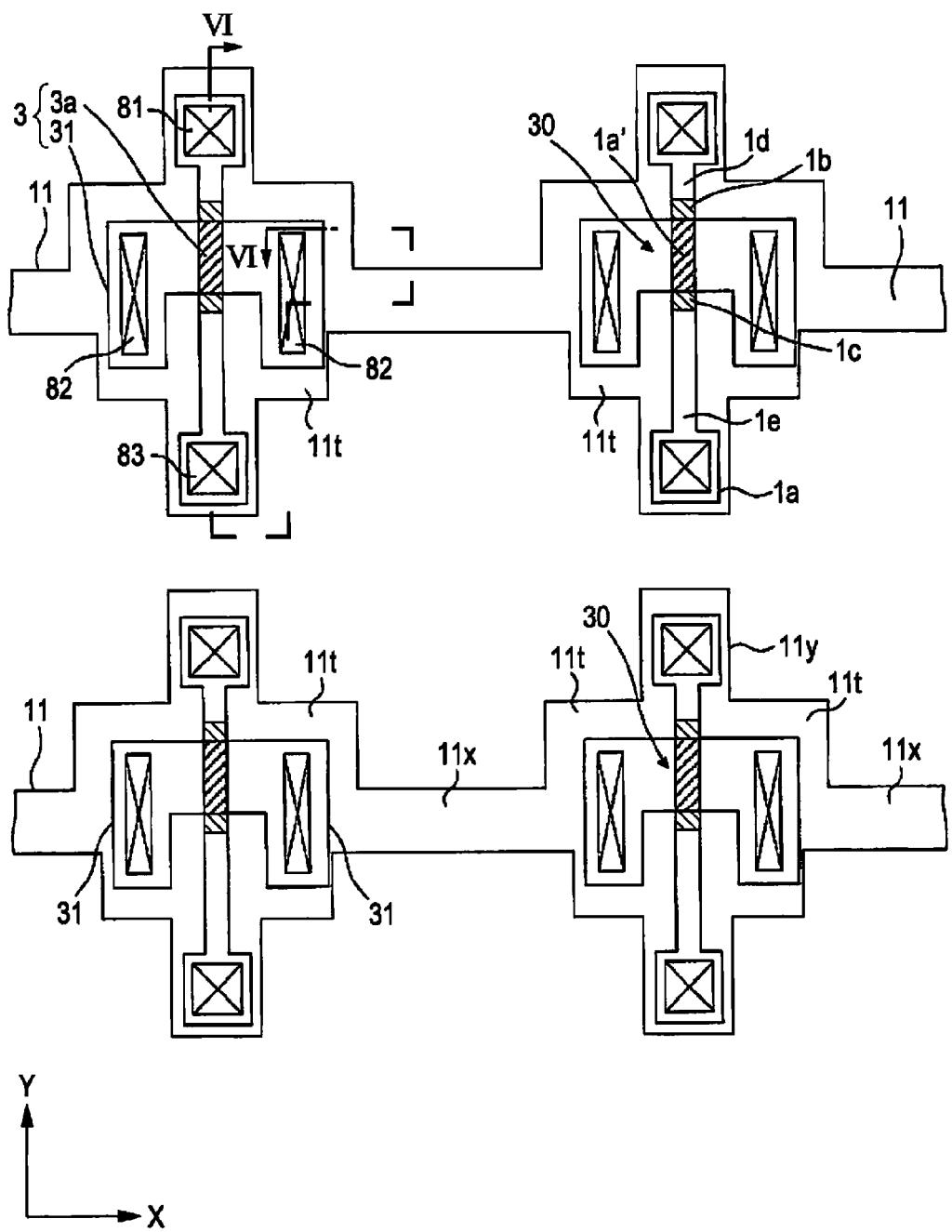
FIG. 4 is a plan view of a plurality of pixel portions (lower layer portion) according to the first embodiment.
Figure 5:
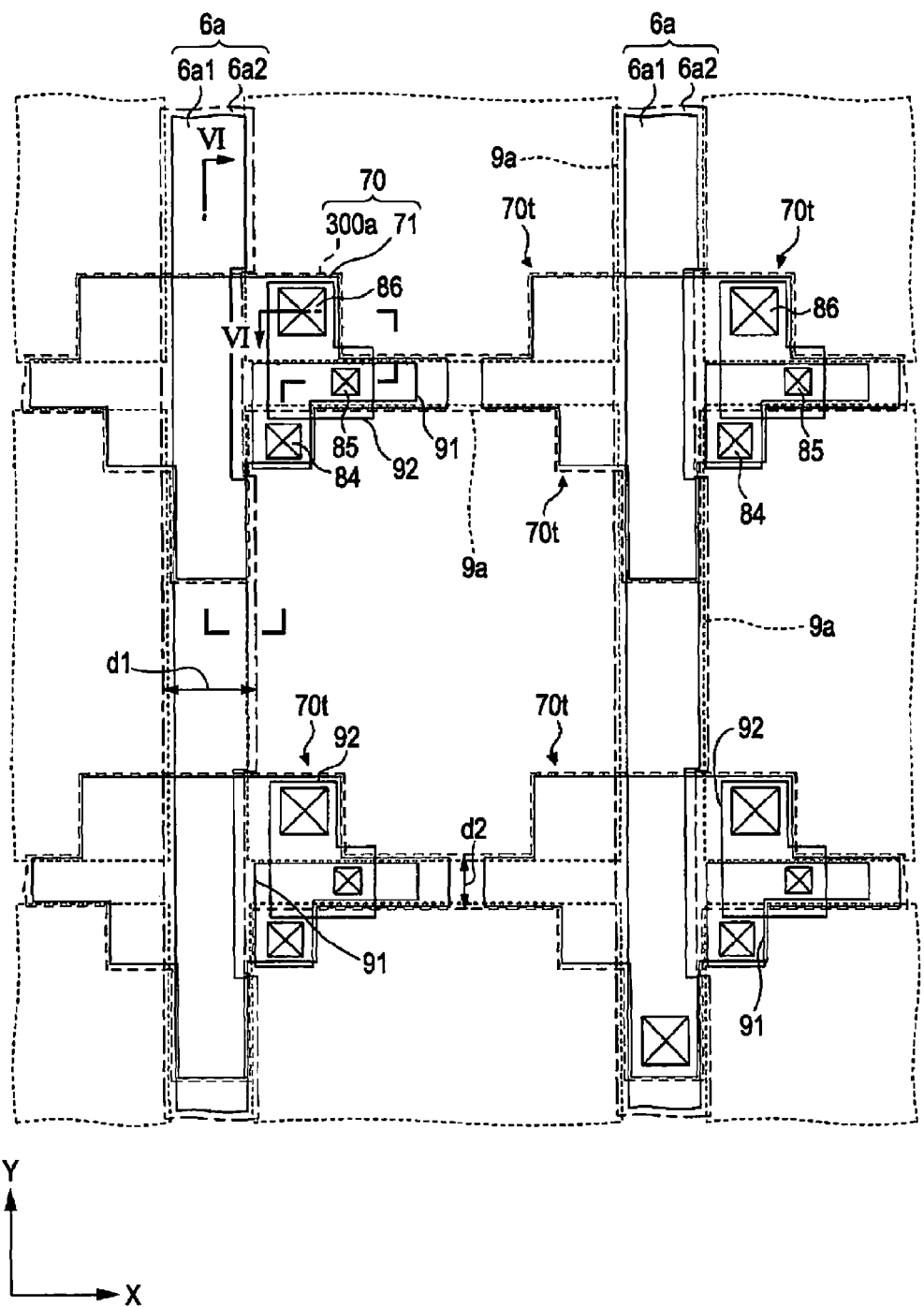
FIG. 5 is a plan view of the plurality of pixel portions (upper layer portion) according to the first embodiment.
Figure 6:
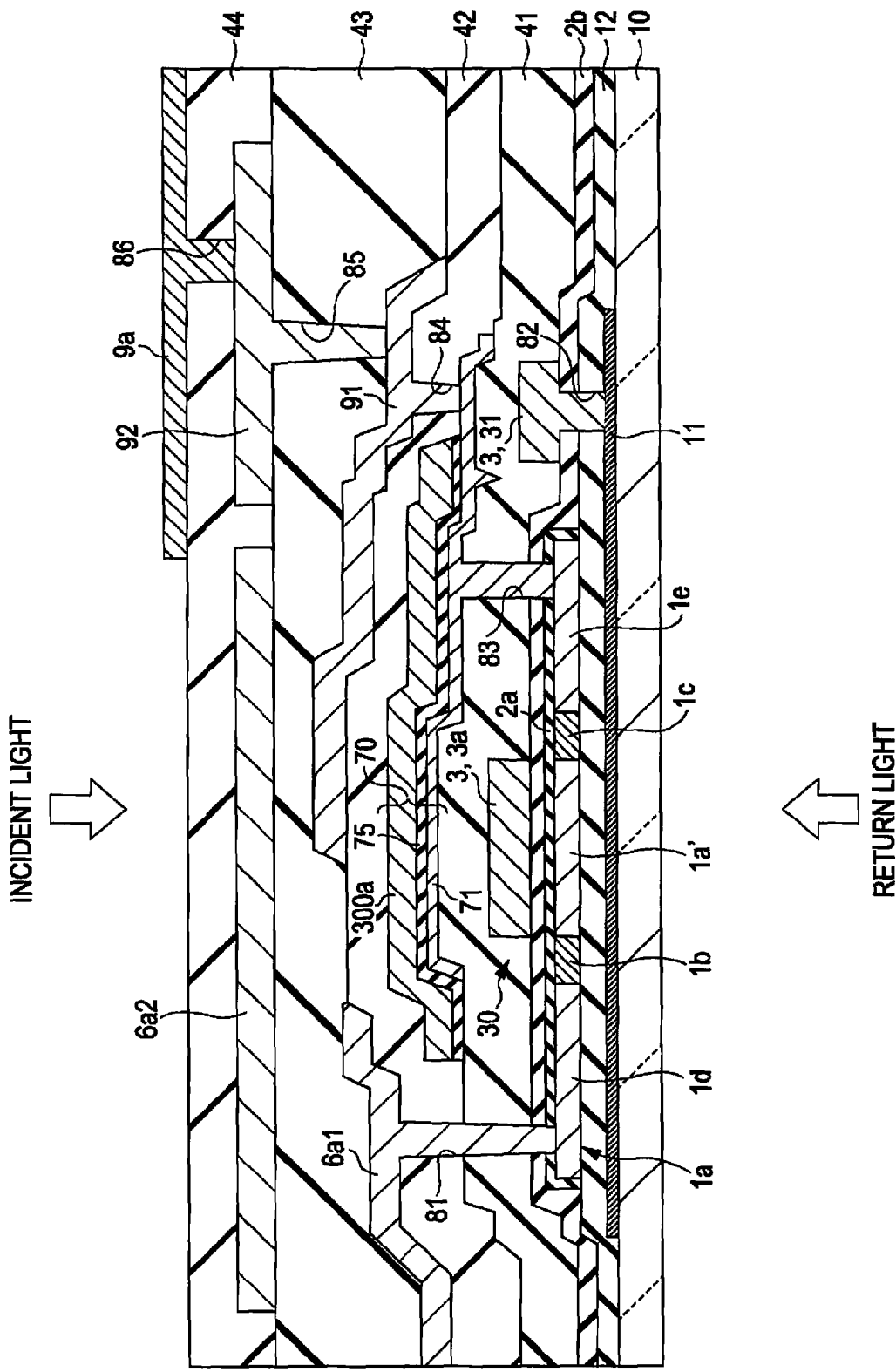
FIG. 6 is a cross-sectional view that is taken along the line VI-VI in FIG. 4 and FIG. 5 being superimposed.

Next, the specific configuration of the pixel portions that implement the above operation will be described with reference to FIG. 4 to FIG. 7. FIG. 4 and FIG. 5 are plan views of a plurality of pixel portions according to the present embodiment. FIG. 4 and FIG. 5 respectively illustrate the lower layer portion (FIG. 4) and the upper layer portion (FIG. 5) of a laminated structure, which will be described later. FIG. 6 is a cross-sectional view that is taken along the line VI-VI in FIG. 4 and FIG. 5 being superimposed. FIG. 7 is a plan view that shows extended portions extending from portions of the scanning lines.

Note that, in FIG. 6, in order to make it easier to recognize the layers and components in the drawings, the scale of each of the layers and components is appropriately varied. In addition, for easier description, portions located on or above the pixel electrodes 9a are not shown in FIG. 5 or FIG. 6.

As shown in FIG. 5, the plurality of pixel electrodes 9a are provided on the TFT array substrate 10 in a matrix (the outlines of the pixel electrodes 9a are indicated by dotted line).

As shown in FIG. 4 and FIG. 5, the data lines 6a (that is, the data lines 6a1 and 6a2) and the scanning lines 11 are provided respectively along the vertical and horizontal boundaries between the adjacent pixel electrodes 9a. That is, the scanning lines 11 extend along the X direction, and the data lines 6a extend along the Y direction so as to intersect with the scanning lines 11. The TFT 30 (see FIG. 4) is provided at each crossover region at which the scanning line 11 and the data line 6a intersect with each other.

The scanning lines 11, the data lines 6a, the storage capacitors 70, relay layers 91 and 92 and the TFTs 30 are arranged in a non-aperture region, which surrounds aperture regions of the pixels (that is, regions of the pixels, in which light is transmitted or reflected to contribute to actual display) corresponding to the pixel electrodes 9a, as viewed in plan on the TFT array substrate 10. That is, these scanning lines 11, storage capacitors 70, data lines 6a, relay layers 91 and 92 and TFTs 30 are arranged not in the aperture regions of the pixels but in the non-aperture region so as not to hinder display. Note that the scanning lines 11, the storage capacitors 70 and the data lines 6a respectively define portions of the non-aperture region.

As shown in FIG. 6, various components, such as the scanning line 11, the TFT 30, the storage capacitor 70, the data lines 6a1 and 6a2 and the pixel electrode 9a, are provided on the TFT array substrate 10 so as to form a laminated structure. This laminated structure is constituted of, from the lower side, a first layer that includes the scanning lines 11, a second layer that includes the TFTs 30 having the gate electrodes 3, and the like, a third layer that includes the storage capacitors 70, a fourth layer that includes the data lines 6a1, and the like, a fifth layer that includes the data lines 6a2, and the like, and a sixth layer (uppermost layer) that includes the pixel electrodes 9a, and the like. In addition, a base insulating film 12 is provided between the first layer and the second layer. A first interlayer insulating film 41 is provided between the second layer and the third layer. A second interlayer insulating film 42 is provided between the third layer and the fourth layer. A third interlayer insulating film 43 is provided between the fourth layer and the fifth layer. A fourth interlayer insulating film 44 is provided between the fifth layer and the sixth layer. These insulating films 12, 41, 42, 43 and 44 prevent short circuit from occurring between the above described components. In addition, contact holes 81, and the like, are, for example, formed in these various insulating films 12, 41, 42, 43 and 44 and electrically connect the data line side source/drain regions 1d of the semiconductor layers 1a of the TFTs 30 to the data lines 6a. These components will now be described sequentially from the lower side. Note that, of the above described laminated structure, the first layer to the first interlayer insulating film are shown in FIG. 4 as a lower layer portion, and the third layer to the sixth layer are shown in FIG. 5 as an upper layer portion.

Configuration of First Layer—Scanning Lines 11, Etc.—

As shown in FIG. 6, the scanning lines 11 are provided as the first layer. The scanning lines 11 are, for example, formed of a light shielding conductive material, such as a high-melting point metal material that includes tungsten (W), titanium (Ti), titanium nitride (TiN), and the like. Note that the scanning line 11 may be regarded as an example of a "light shielding portion" according to the aspects of the invention.

As shown in FIG. 4, the scanning lines 11 are patterned in a stripe along the X direction.

As shown in FIG. 7 together with FIG. 4, as seen in more detail, each of the scanning lines 11 includes a main line portion 11x that extends along the X direction and projecting portions 11y that extend from the main line portion 11x to overlap the data lines 6a along the Y direction. The projecting portions 11y of the adjacent scanning lines 11 are not connected to each other. Thus, the scanning lines 11 are separated one by one from one another. Each scanning line 11 serves as a lower light shielding film that shields the semiconductor layer 1a (particularly, the channel region 1a' and its surrounding portion) of the TFT 30 against return light that enters the liquid crystal device from the side of the TFT array substrate 10.

Here, in the present embodiment, extended portions 11t are specifically provided. Each of the extended portions 11t extends from the main line portion 11x and the projecting portion 11y of the corresponding scanning line 11, and is formed in a crossover region, at which the scanning line 11 and the data line 6a intersect with each other, so as to extend from the corner of an aperture region toward the center of the aperture region. Thus, in comparison with the case in which no extended portions 11t are provided, return light that would enter the semiconductor layers 1a of the TFTs 30 may be effectively blocked by the extended portions 11t in addition to the main line portions 11x and the projecting portions 11y, which serve as the lower light shielding films. Hence, the light shielding ability for the TFTs 30 may be enhanced to thereby make it possible to further reliably reduce, for example, the occurrence of light leakage current in the TFTs 30.

Furthermore, particularly in the present embodiment, the extended portion 11t is formed at each of the four corners of the aperture region of each pixel. In other words, four extended portions 11t are provided around each semiconductor layer 1a provided at the crossover region. Thus, return light that would enter the semiconductor layers 1a may be further reliably blocked by the extended portions 11t.

Configuration of Second Layer—Tfts 30, Etc.—

As shown in FIG. 6, the TFTs 30 are provided as the second layer.

As shown in FIG. 4 and FIG. 6, each of the TFTs 30 is formed to include the semiconductor layer 1a and the gate electrode 3a.

Each of the semiconductor layers 1a is, for example, formed of polysilicon and includes a channel region 1a' having a channel length along the Y direction, a data line side LDD region 1b, a pixel electrode side LDD region 1c, a data line side source/drain region 1d and a pixel electrode side source/drain region 1e. That is, each of the TFTs 30 has an LDD structure.

The data line side source/drain region 1d and the pixel electrode side source/drain region 1e are formed in substantially mirror symmetry along the Y direction with respect to the channel region 1a'. The data line side LDD region 1b is formed between the channel region 1a' and the data line side source/drain region 1d. The pixel electrode side LDD region 1c is formed between the channel region 1a' and the pixel electrode side source/drain region 1e. The data line side LDD region 1b, the pixel electrode side LDD region 1c, the data line side source/drain region 1d and the pixel electrode side source/drain region 1e are impurity regions that are formed by implanting impurities into the semiconductor layer 1a by means of impurity implantation, such as ion implantation, for example. The data line side LDD region 1b and the pixel electrode side LDD region 1c are formed as low-concentration impurity regions that respectively have smaller impurities than the data line side source/drain region 1d and the pixel electrode side source/drain region 1e. According to the above impurity regions, while the TFT 30 is not operating, it is possible to reduce an off current that flows through the source region and the drain region and also possible to suppress a decrease in on current that flows while the TFT 30 is operating and an increase in off leakage current. Note that the TFT 30 preferably has an LDD structure; however, the TFT 30 may have an offset structure in which impurities are not implanted in the data line side LDD region 1b and the pixel electrode side LDD region 1c, or may have a self-aligned structure in which the data line side source/drain region and the pixel electrode side source/drain region are formed by densely implanting impurities using the gate electrode as a mask.

The scanning lines 11 and the semiconductor layers 1a are electrically insulated by the base insulating film 12. The base insulating film 12 not only has a function of electrically insulating the semiconductor layers 1a from the scanning lines 11, but also has a function of preventing the surface of the TFT array substrate 10 from being rough while the surface is being polished and a function of preventing the characteristics of the pixel switching TFTs 30 from being degraded because of dirt that is left after washing, or the like, by forming the base insulating film 12 all over the TFT array substrate 10.

As shown in FIG. 4 and FIG. 6, the gate electrodes 3 are arranged in the upper layer side above the semiconductor layers 1a through gate insulating films 2a and 2b. That is, each of the TFTs 30 is formed as a top-gate TFT. The gate electrodes 3 are, for example, formed of a light shielding conductive material, such as a high-melting point metal material that includes W, Ti, TiN, and the like. Note that the gate electrodes 3 may be, for example, formed of conductive polysilicon.

As shown in FIG. 4, each gate electrode 3 includes a main body portion 3a that overlaps the channel region 1a' of the TFT 30 and elongated portions 31 that are elongated from the main body portion 3a along the Y direction. Each gate electrode 3 is electrically connected to the scanning line 11 through a contact hole 82 that is formed to extend through the gate insulating film 2b and the base insulating film 12.

The contact hole 82 is formed on each side of the semiconductor layer 1a as a wall-shaped light shielding body along the Y direction. Thus, it is possible to block light that would obliquely enter the semiconductor layer 1a from both sides thereof. Hence, the light shielding ability for the TFTs 30 may be enhanced to thereby make it possible to further reliably reduce, for example, light leakage current in the TFTs 30.

Note that, in the present embodiment, the gate electrode 3 of each TFT 30 is separately formed; however, for example, the gate electrodes 3 of the TFTs 30 corresponding to the same scanning line 11 (that is, the TFTs 30 adjacent to each other along the X direction) may be formed continuously with each other. In other words, the gate electrodes 3 of the TFTs 30 corresponding to the same scanning line 11 may be formed in another scanning line and arranged in a layer on the side opposite to the corresponding scanning line 11 with respect to the semiconductor layers 1a. In this case, the scanning line may be formed of double lines and, therefore, a scanning signal may be further reliably supplied to the gate electrodes 3.

Configuration of Third Layer—Storage Capacitor 70, Etc.—

As shown in FIG. 6, the storage capacitors 70 are provided as the third layer. Each of the storage capacitors 70 is provided on an upper layer side above the TFT 30 through the first interlayer insulating film 41.

Each of the storage capacitors 70 is formed so that an upper capacitor electrode 300a and a lower capacitor electrode 71 are opposed through a dielectric film 75. The lower capacitor electrode 71, the dielectric film 75 and the upper capacitor electrode 300a are laminated from the lower layer side in this order. Note that the lower capacitor electrode 71 may be regarded as a "first conductive film" according to the aspects of the invention, and the upper capacitor electrode 300a may be regarded as a "second conductive film" according to the aspects of the invention.

As shown in FIG. 5 and FIG. 6, the upper capacitor electrode 300a is formed as portion of the capacitor line 300. The capacitor line 300 extends from the image display area 10a, in which the pixel electrodes 9a are arranged, to the periphery of the image display area 10a The upper capacitor electrode 300a is a fixed-potential capacitor electrode, which is electrically connected through the capacitor line 300 to a constant-potential source and maintained at a fixed potential. The upper capacitor electrode 300a is, for example, formed of an opaque metal film that contains metal, such as Al (aluminum), Ag (silver), for example, or alloy of them, and serves as an upper side light shielding film (internal light shielding film) that shields the TFT 30. Note that, the upper capacitor electrode 300a may be, for example, formed of metal simple substance, alloy, metal silicide, or polysilicide, which contains at least one of high-melting point metals, such as Ti (titanium), Cr (chromium), W (tungsten), Ta (tantalum), Mo (molybdenum), Pd (palladium), or a laminated structure of them.

The lower capacitor electrode 71 is a pixel electric potential side capacitor electrode that is electrically connected to both the pixel electrode side source/drain region 1e of the TFT 30 and the pixel electrode 9a. More specifically, the lower capacitor electrode 71 is electrically connected through a contact hole 83 (see FIG. 4) to the pixel electrode side source/drain region 1e and also electrically connected through a contact hole 84, which is formed in the second interlayer insulating film 42, to the relay layer 91, which is arranged in the same layer (that is, fourth layer) as the data lines 6a1, which will be described later. Furthermore, the relay layer 91 is electrically connected through a contact hole 85, which is formed in the third interlayer insulating film 43, to the relay layer 92, which is arranged in the same layer (fifth layer) as the data lines 6a2, which will be described later. Moreover, the relay layer 92 is electrically connected through a contact hole 86, which is formed in the fourth interlayer insulating film 44, to the pixel electrode 9a. That is, the lower capacitor electrode 71, in cooperation with the relay layers 91 and 92, relays electrical connection between the pixel electrode side source/drain region 1e and the pixel electrode 9a. The lower capacitor electrode 71 is, for example, formed of conductive polysilicon. Thus, each of the storage capacitors 70 has a so-called MIS structure. Here, the lower capacitor electrode 71 not only serves as the pixel electric potential side capacitor electrode but also serves as a light absorption layer or a light shielding film arranged between the TFT 30 and the upper capacitor electrode 300a serving as the upper side light shielding film.

The dielectric film 75 has a monolayer structure or a multilayer structure, which is, for example, formed of a silicon oxide film, such as HTO (High Temperature Oxide) film or LTO (Low Temperature Oxide) film, a silicon nitride film, or an insulative metal oxide, such as alumina or hafnia, or the like.

Note that each lower capacitor electrode 71, as well as the upper capacitor electrode 300a, may be formed of a metal film. That is, each storage capacitor 70 may be formed of a so-called MIM structure, which includes a three-layer structure consisting of a metal film, a dielectric film (insulating film), and a metal film.

As shown in FIG. 5, each storage capacitor 70 has extended portions 70t, each of which extends from a corner of an aperture region toward the center of the aperture region in a crossover region at which the scanning line 11 and the data line 6a intersect with each other. In other words, each of the upper capacitor electrode 300a and the lower capacitor electrode 71, which serve as the upper side light shielding film, is formed in a crossover region, at which the scanning line 11 and the data line 6a intersect with each other, so as to extend from a corner of an aperture region toward the center of the aperture region. Each extended portion 70t is formed to substantially overlap a corresponding one of the extended portions 11t, which are described with reference to FIG. 4 and FIG. 7, and to define portion of the non-aperture region. Thus, in comparison with the case in which no extended portions 70t are provided, light that would enter the semiconductor layers 1a of the TFTs 30 from the upper layer side may be effectively blocked by the extended portions 70t. Hence, the light shielding ability for the TFTs 30 may be enhanced to thereby make it possible to further reliably reduce the occurrence of light leakage current in the TFTs 30.

Configuration of Fourth Layer—Data Lines 6a1, Etc.—

As shown in FIG. 6, the data lines 6a1 are provided as the fourth layer. In addition, in the fourth layer, the relay layers 91 are formed from the same film as the data lines 6a1. Here, the same film means that a thin film formed of the same conductive material is patterned at the same time.

As shown in FIG. 5 and FIG. 6, each of the data lines 6a1 is electrically connected to the data line side source/drain regions 1d of the semiconductor layers 1a through the contact holes 81 (see FIG. 4), which are formed to extend through the first interlayer insulating film 41, the second interlayer insulating film 42, and the gate insulating films 2a and 2b. The data line 6a1 and the inside of the contact hole 81 are, for example, formed of a material that contains Al (aluminum), such as Al—Si—Cu or Al—Cu, Al simple substance, or a multilayer film formed of Al layer and TiN layer. The data line 6a1 also has a function of shielding the TFT 30 against light.

The relay layer 91 is formed in the same layer as the data line 6a1 on the second interlayer insulating film 42. The data line 6a1 and the relay layer 93 are, for example, formed in such a manner that a thin film formed of a conductive material, such as a metal film, is formed on the second interlayer insulating film 42 using thin-film formation method, and the thin film is partly removed, that is, patterned. Thus, the data line 6a1 and the relay layer 93 are formed so as to be spaced apart from each other. Thus, because the data line 6a1 and the relay layer 93 may be formed in the same process, it is possible to simplify a manufacturing process of the liquid crystal device.

Here, particularly in the present embodiment, the contact hole 84 that electrically connects the lower capacitor electrode 71 to the relay layer 91 is arranged so as to overlap the extended portions 11t and 70t as viewed in plan on the TFT array substrate 10. That is, the contact hole 84 is formed in the second interlayer insulating film 42 at a position that overlaps the extended portion 11t as viewed in plan on the TFT array substrate 10. Thus, within the non-aperture region, the contact hole 84 is arranged in a region in which the extended portion 11t is formed as a light shielding region for enhancing light shielding property for the TFT 30. Thus, it is possible to prevent unnecessary enlargement of the width d1 of a region extending along the data line 6a or the width d2 of a region extending along the scanning line 11 or prevent additional unnecessary enlargement of portion of the non-aperture region in order to arrange the contact hole 84 only, so that a further larger aperture region may be ensured for each pixel. That is, it is possible to improve the aperture ratio.

In addition, the contact hole 84 is arranged so as to overlap the extended portion 11t, light that would obliquely enter the semiconductor layer 1a from the upper layer side thereof may be further reliably blocked by the contact hole 84 (that is, portion of the relay layer 91, formed inside the contact hole 84).

Configuration of Fifth Layer—Data Line 6a2, Etc.—

As shown in FIG. 6, the data lines 6a2 are provided as the fifth layer. In addition, in the fifth layer, the relay layers 92 are formed from the same film as the data lines 6a2.

As shown in FIG. 5, each of the data lines 6a2 is formed to extend along the data line 6a1 (that is, along the Y direction), and is electrically connected to the data line 6a1 through a contact hole (not shown), which is formed in the third interlayer insulating film 43. That is, each data line 6a is formed of double lines consisting of the data lines 6a1 and 6a2. Each data line 6a2 is, for example, formed of a material that contains Al, such as Al—Si—Cu or Al—Cu, Al simple substance, or a multilayer film formed of Al layer and TiN layer. Each data line 6a2 also has a function of shielding the TFT 30 against light.

The relay layer 92 is formed in the same layer as the data line 6a2 on the third interlayer insulating film 43.

Note that the contact hole 85 that electrically connects the relay layer 91 to the relay layer 92 and the contact hole 84 that electrically connects the lower capacitor electrode 71 to the relay layer 91 may be arranged so that their positions are interchanged as viewed in plan on the TFT array substrate 10. In this case as well, it is possible to prevent unnecessary enlargement of the non-aperture region in order to arrange the contact holes 84 and 85 only.

Note that in the present embodiment, the wiring of the fifth layer is formed as the second data line 6a2; however, the wiring of the fifth layer may be supplied with a fixed electric potential to form a shielding layer between the data line 6a1 and the pixel electrode 9a (in other words, a fixed electric potential line supplied with a fixed electric potential may be formed in the fifth layer in place of the data line 6a2, and the fixed electric potential line may serve as an electromagnetic shielding film that reduces or prevents electromagnetic interference between the data line 6a1 and the pixel electrode 9a). In addition, as in the case of a second embodiment, which will be described later, the wiring of the fifth layer may be supplied with a capacitive electric potential and then may be electrically connected to the upper capacitor electrode 300a. In this case, each capacitor line may be formed of double lines.

Configuration of Sixth Layer—Pixel Electrodes 9a, Etc.—

As shown in FIG. 6, the pixel electrodes 9a are provided as the sixth layer. Each of the pixel electrodes 9a is formed on an upper layer side above the data line 6a2 through the fourth interlayer insulating film 44.

As shown in FIG. 5 and FIG. 6, each pixel electrode 9a is electrically connected through the lower capacitor electrode 71, the contact holes 83, 84, 85 and 86, and the relay layers 91 and 92 to the pixel electrode side source/drain region 1e of the semiconductor layer 1a. An alignment layer, on which a predetermined alignment process such as rubbing process has been performed, is provided on the upper surface of the pixel electrode 9a.

The above described configuration of each pixel portion is common to other pixel portions as shown in FIG. 4 and FIG. 5. The above configured pixel portion is regularly formed in the image display area 10a (see FIG. 1).

As described above, according to the liquid crystal device of the present embodiment, it is possible to enhance light shielding property for the TFTs 30 while improving the aperture ratio, and, as a result, it is possible to display a bright, high-quality image.

Second Embodiment

Figure 8:
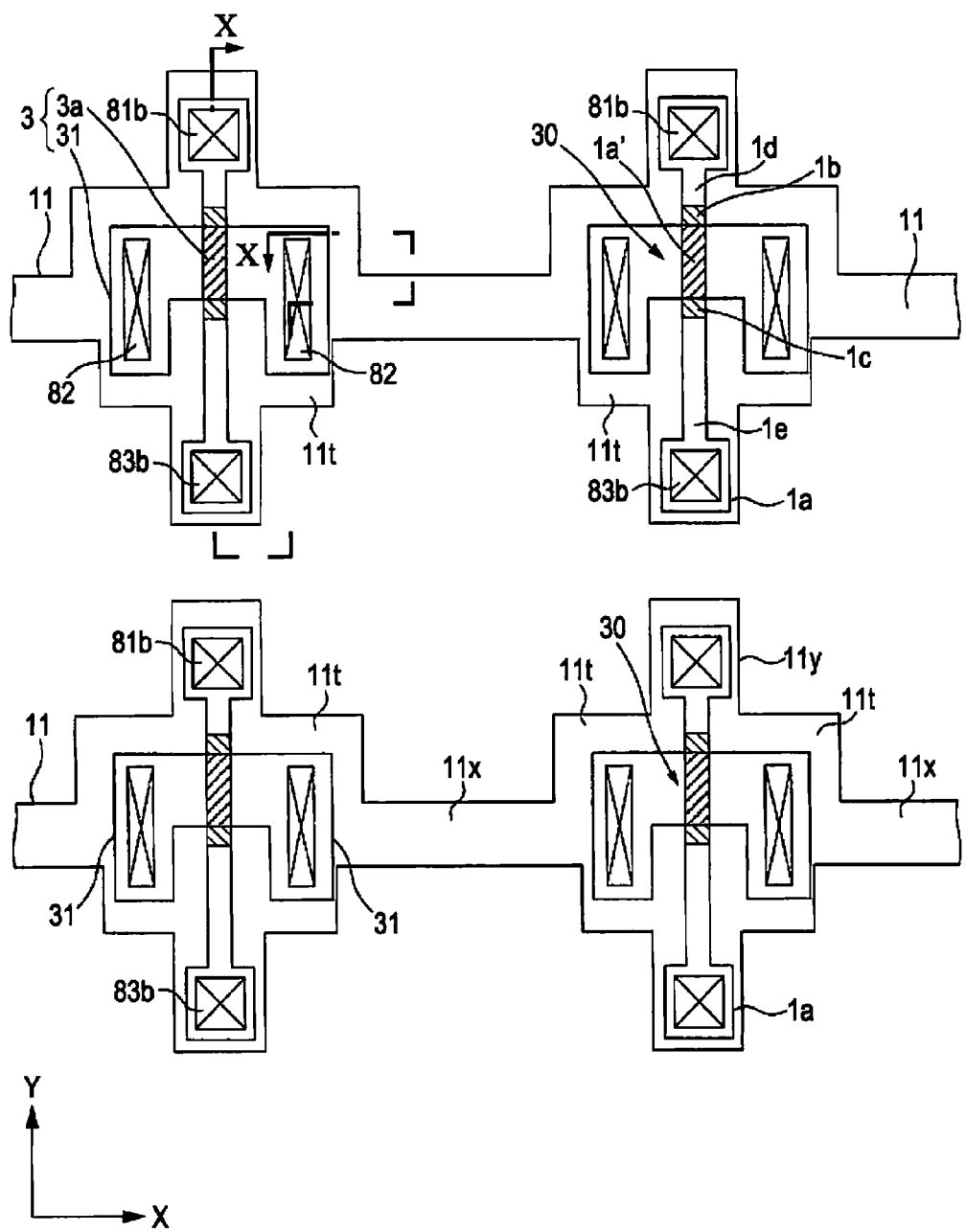
FIG. 8 is a plan view of a plurality of pixel portions (lower layer portion) according to a second embodiment.
Figure 9:
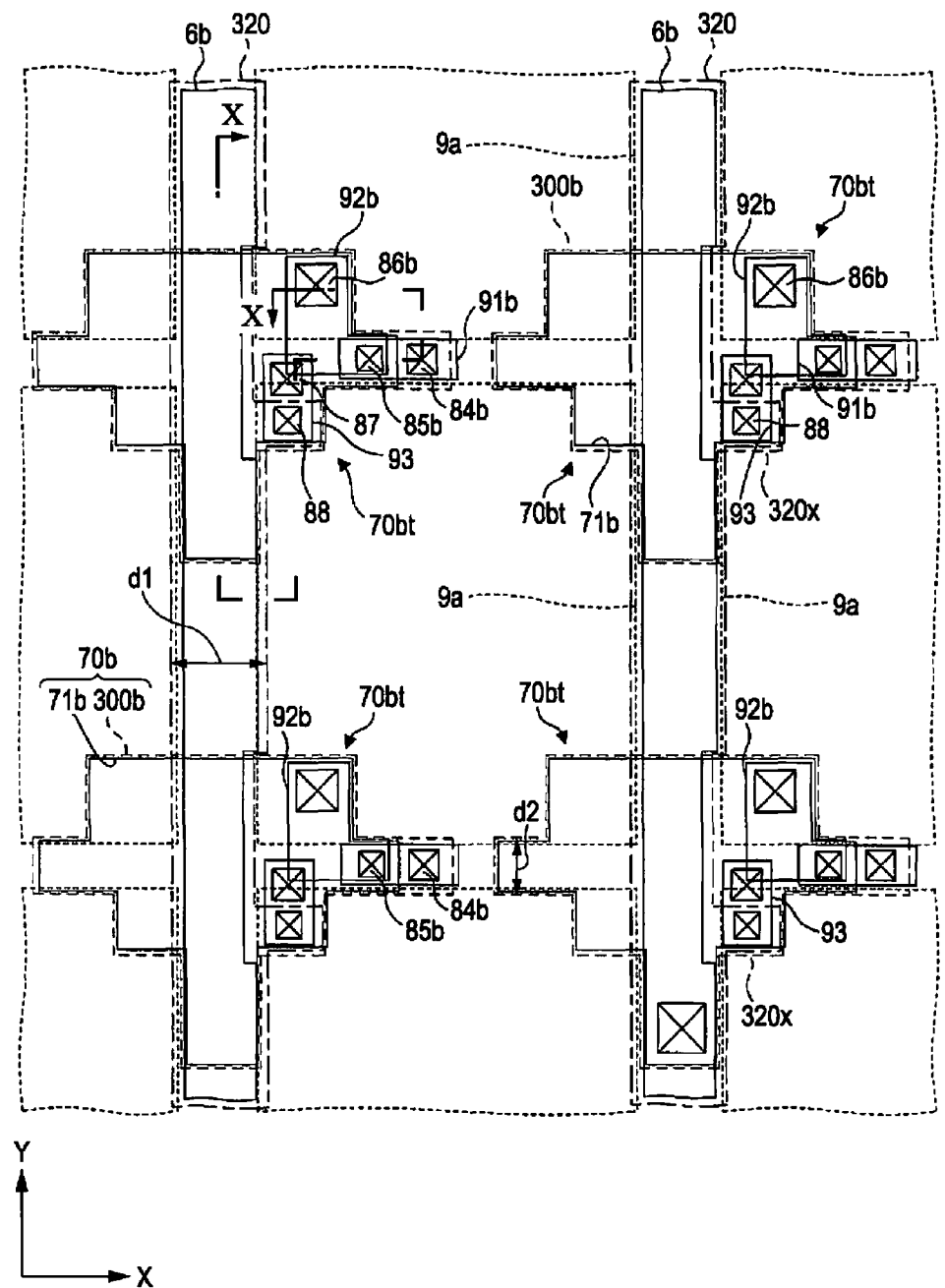
FIG. 9 is a plan view of the plurality of pixel portions (upper layer portion) according to the second embodiment.
Figure 10:
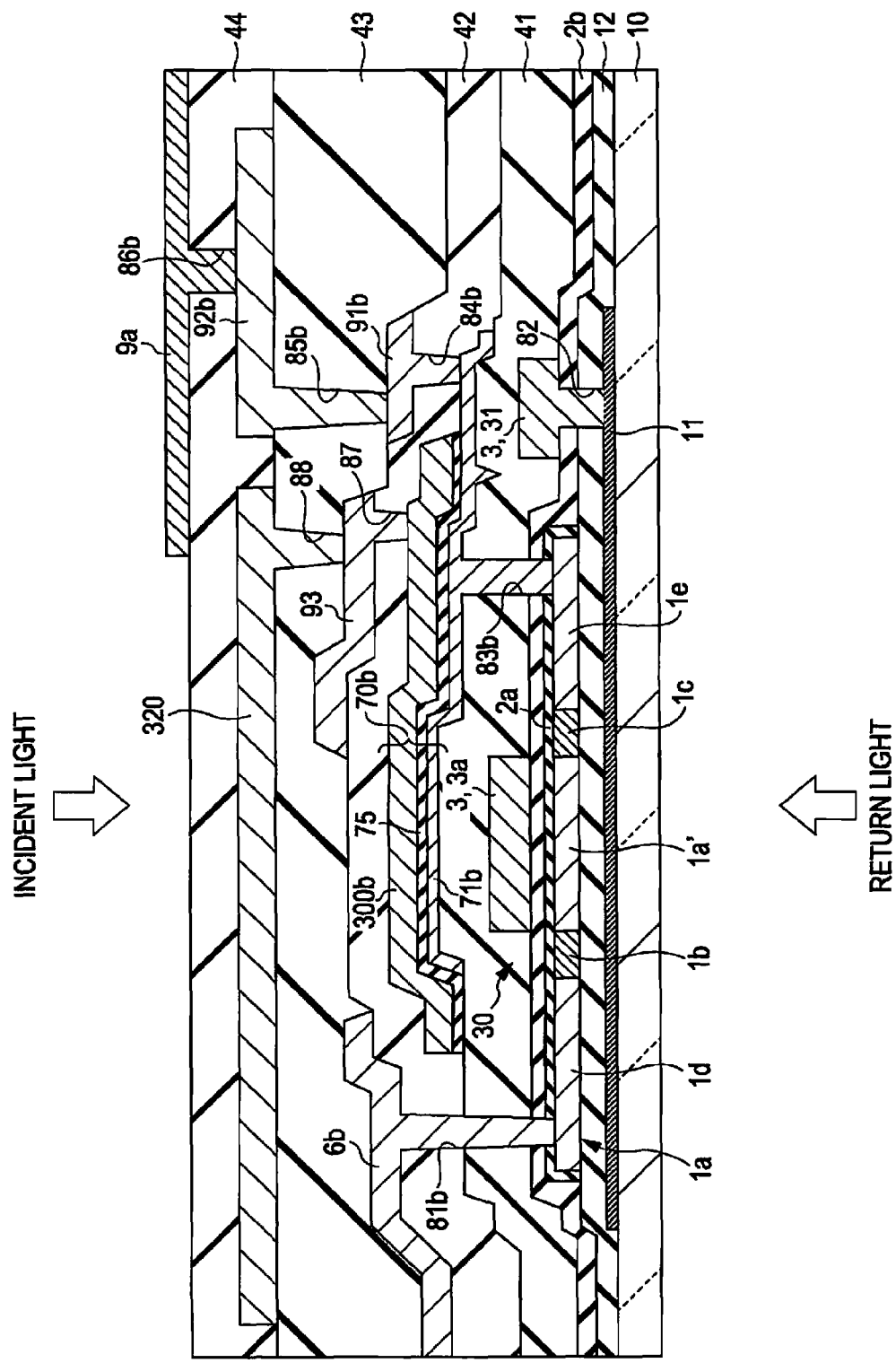
FIG. 10 is a cross-sectional view that is taken along the line X-X in FIG. 8 and FIG. 9 being superimposed.

A liquid crystal device according to a second embodiment will now be described with reference to FIG. 8 to FIG. 10. FIG. 8 and FIG. 9 are plan views of a plurality of pixel portions according to the present embodiment. FIG. 8 and FIG. 9 respectively illustrate the lower layer portion (FIG. 8) and the upper layer portion (FIG. 9) of a laminated structure, which will be described later. FIG. 10 is a cross-sectional view that is taken along the line X-X in FIG. 8 and FIG. 9 being superimposed.

Note that, in FIG. 10, in order to make it easier to recognize the layers and components in the drawings, the scale of each of the layers and components is appropriately varied. In addition, for easier description, portions located on or above the pixel electrodes 9a are not shown in FIG. 9 or FIG. 10.

Note that in FIG. 8 to FIG. 10, the same reference numerals are assigned to the similar components to those of the first embodiment shown in FIG. 1 to FIG. 7, and description thereof will be omitted appropriately.

As shown in FIG. 8 to FIG. 10, the liquid crystal device according to the second embodiment differs from the liquid crystal device of the above described first embodiment in that data lines 6b, storage capacitors 70b and capacitor lines 320 are provided in place of the data lines 6a, the storage capacitors 70 and the capacitor lines 300 of the above described first embodiment, and the other portions are substantially the same as the liquid crystal device according to the above described first embodiment.

As shown in FIG. 8 and FIG. 9, the data lines 6b and the scanning lines 11 are provided respectively along the vertical and horizontal boundaries between the adjacent pixel electrodes 9a. The TFT 30 is provided at each crossover region at which the scanning line 11 and the data line 6b intersect with each other.

The scanning lines 11, the data lines 6b, the storage capacitors 70b, relay layers 91b, 92b and 93 and the TFTs 30 are arranged in a non-aperture region, which surrounds aperture regions of the pixels corresponding to the pixel electrodes 9a, as viewed in plan on the TFT array substrate 10. Note that the scanning lines 11, the storage capacitors 70b and the data lines 6b respectively define portions of the non-aperture region.

As shown in FIG. 10, various components, such as the scanning line 11, the TFT 30, the storage capacitor 70b, the data line 6b and the pixel electrode 9a, are provided on the TFT array substrate 10 so as to form a laminated structure. This laminated structure is constituted of, from the lower side, a first layer that includes the scanning lines 11, a second layer that includes the TFTs 30 having the gate electrodes 3, and the like, a third layer that includes the storage capacitors 70b, a fourth layer that includes the data lines 6b, and the like, a fifth layer that includes the capacitor lines 320, and the like, and a sixth layer that includes the pixel electrodes 9a, and the like. These components will now be described sequentially from the lower side. Note that, of the above described laminated structure, the first layer to the first interlayer insulating film 41 are shown in FIG. 8 as a lower layer portion, and the third layer to the sixth layer are shown in FIG. 9 as an upper layer portion.

Configuration of First Layer—Scanning Lines 11, Etc.—

As shown in FIG. 10, the scanning lines 11 are provided as the first layer. Each of the scanning lines 11 is formed as in the similar manner to the above described first embodiment and includes a main line portion 11x that extends along the X direction and projecting portions 11y that extend from the main line portion 11x to overlap the data lines 6b along the Y direction.

In the present embodiment, the extended portions 11t are provided, as in the case of the above described first embodiment. Thus, in comparison with the case in which no extended portions 11t are provided, return light that would enter the semiconductor layers 1a of the TFTs 30 may be effectively blocked by the extended portions 11t.

Configuration of Second Layer—Tfts 30, Etc.—

As shown in FIG. 10, the TFTs 30 are provided as the second layer. Each of the TFTs 30 is formed to include the semiconductor layer 1a and the gate electrode 3a, as in the case of the above described first embodiment.

Configuration of Third Layer—Storage Capacitor 70b, Etc.—

As shown in FIG. 10, the storage capacitors 70b are provided as the third layer. Each of the storage capacitors 70b is provided on an upper layer side above the TFT 30 through the first interlayer insulating film 41.

Each of the storage capacitors 70b is formed so that an upper capacitor electrode 300b and a lower capacitor electrode 71b are opposed through a dielectric film 75. The lower capacitor electrode 71b, the dielectric film 75 and the upper capacitor electrode 300b are laminated from the lower layer side in this order.

As shown in FIG. 9 and FIG. 10, the upper capacitor electrode 300b is formed in an island shape for each TFT 30 so as to cover the channel region 1a' of the semiconductor layer 1a and its surrounding portion. The upper capacitor electrode 300b is a fixed-potential capacitor electrode, which is electrically connected through the capacitor line 320, which will be described later, to a constant-potential source and maintained at a fixed potential. More specifically, the upper capacitor electrode 300b is electrically connected through a contact hole 87, which is formed in the second interlayer insulating film 42, to the relay layer 93, which is arranged in the same layer (that is, fourth layer) as the data line 6b, which will be described later. Furthermore, the relay layer 93 is electrically connected through a contact hole 88, which is formed in the third interlayer insulating film 43, to the capacitor line 320. That is, the relay layer 93 relays electrical connection between the upper capacitor electrode 300b and the capacitor line 320. The upper capacitor electrode 300b is, for example, formed of an opaque metal film that contains metal, such as Al, Ag, for example, or alloy of them, and serves as an upper side light shielding film that shields the TFT 30. Note that the upper capacitor electrode 300b and the relay layer 93 may be regarded as an example of a "first conductive film" and an example of a "second conductive film" according to the aspects of the invention, respectively, and the relay layer 93 and the capacitor line 320 may be regarded as an example of a "first conductive film" and an example of a "second conductive film" according to the aspects of the invention, respectively.

The lower capacitor electrode 71b is a pixel electric potential side capacitor electrode that is electrically connected to both the pixel electrode side source/drain region 1e of the TFT 30 and the pixel electrode 9a. More specifically, the lower capacitor electrode 71b is electrically connected through a contact hole 83b to the pixel electrode side source/drain region 1e and also electrically connected through a contact hole 84b, which is formed in the second interlayer insulating film 42, to the relay layer 91b, which is arranged in the same layer (that is, fourth layer) as the data lines 6b. Furthermore, the relay layer 91b is electrically connected through a contact hole 85b, which is formed in the third interlayer insulating film 43, to the relay layer 92b, which is arranged in the same layer (fifth layer) as the capacitor lines 320. Moreover, the relay layer 92b is electrically connected through a contact hole 86b, which is formed in the fourth interlayer insulating film 44, to the pixel electrode 9a. That is, the lower capacitor electrode 71b, in cooperation with the relay layers 91b and 92b, relays electrical connection between the pixel electrode side source/drain region 1e and the pixel electrode 9a. The lower capacitor electrode 71b is, for example, formed of conductive polysilicon. Thus, each of the storage capacitors 70b has a so-called MIS structure.

As shown in FIG. 9, particularly in the present embodiment, each storage capacitor 70b has extended portions 70bt, each of which extends from a corner of an aperture region toward the center of the aperture region in a crossover region at which the scanning line 11 and the data line 6b intersect with each other. In other words, each of the upper capacitor electrode 300b and the lower capacitor electrode 71b, which serve as the upper side light shielding film, is formed in a crossover region, at which the scanning line 11 and the data line 6b intersect with each other, so as to extend from a corner of an aperture region toward the center of the aperture region. Each extended portion 70bt is formed to substantially overlap a corresponding one of the extended portions 11t (see FIG. 8 or FIG. 7) and to define portion of the non-aperture region. Thus, in comparison with the case in which no extended portions 70bt are provided, light that would enter the semiconductor layers 1a of the TFTs 30 from the upper layer side may be effectively blocked by the extended portions 70bt. Hence, the light shielding ability for the TFTs 30 may be enhanced to thereby make it possible to further reliably reduce, for example, the occurrence of light leakage current in the TFTs 30.

Furthermore, particularly in the present embodiment, the extended portion 70bt is formed at each of the four corners of the aperture region of each pixel. In other words, four extended portions 70bt are provided around each semiconductor layer 1a provided at the crossover region. Thus, light that would enter the semiconductor layers 1a from the upper layer side thereof may be further reliably blocked by the extended portions 70bt.

Configuration of Fourth Layer—Data Lines 6b, Etc.—

As shown in FIG. 10, the data lines 6b are provided as the fourth layer. In addition, in the fourth layer, the relay layers 93 and 91b each are formed from the same film as the data lines 6b.

As shown in FIG. 9 and FIG. 10, each of the data lines 6b is electrically connected to the data line side source/drain regions 1d of the semiconductor layers 1a through the contact holes 81b, which are formed to extend through the first interlayer insulating film 41, the second interlayer insulating film 42, and the gate insulating films 2a and 2b. The data line 6b and the inside of the contact hole 81b are, for example, formed of a material that contains Al, such as Al—Si—Cu or Al—Cu, Al simple substance, or a multilayer film formed of Al layer and TiN layer. The data line 6b also has a function of shielding the TFT 30 against light.

The relay layers 91b and 93 each are formed in the same layer as the data line 6b on the second interlayer insulating film 42.

Here, particularly in the present embodiment, the contact hole 87 that electrically connects the upper capacitor electrode 300b to the relay layer 93 is arranged so as to overlap the extended portions 11t and 70bt as viewed in plan on the TFT array substrate 10. That is, the contact hole 87 is formed in the second interlayer insulating film 42 at a position that overlaps the extended portions 11t and 70bt as viewed in plan on the TFT array substrate 10. Thus, within the non-aperture region that is defined by the data lines 6b, the scanning lines 11 and the storage capacitors 70b, the contact holes 87 are arranged in a region, in which the extended portions 11t and 70bt are formed, as a light shielding region for further reliably reducing light leakage current in the TFTs 30. Thus, it is possible to prevent unnecessary enlargement of the width d1 of a region extending along the data line 6b or the width d2 of a region extending along the scanning line 11 or prevent additional unnecessary enlargement of portion of the non-aperture region in order to arrange the contact hole 87 only, so that a further larger aperture region may be ensured for each pixel.

In addition, the contact hole 87 is arranged so as to overlap the extended portions 11t and 70bt, light that would obliquely enter the semiconductor layer 1a from the upper layer side thereof may be further reliably blocked by the contact hole 87 (that is, portion of the relay layer 93, formed inside the contact hole 87).

Configuration of Fifth Layer—Capacitor Lines 320, Etc.—

As shown in FIG. 10, the capacitor lines 320 are provided as the fifth layer. In addition, in the fifth layer, the relay layers 92b are formed from the same film as the capacitor lines 320.

As shown in FIG. 9, each capacitor line 320 includes a main line portion that extends along the data line 6b (that is, along the Y direction) and projecting portions 320x that extend from the main line portion along the X direction. Each capacitor line 320 is electrically connected to the relay layers 93 through contact holes 88 at the projecting portions 320x. Each capacitor line 320 is, for example, formed of a material that contains Al, such as Al—Si—Cu or Al—Cu, Al simple substance, or a multilayer film formed of Al layer and TiN layer. The capacitor line 320 also has a function of shielding the TFT 30 against light.

Here, particularly in the present embodiment, the contact hole 88 that electrically connects the capacitor line 320 to the relay layer 93 is arranged so as to overlap the extended portions 11t and 70bt as viewed in plan on the TFT array substrate 10. That is, the contact hole 88 is formed in the third interlayer insulating film 43 at a position that overlaps the extended portions 11t and 70bt as viewed in plan on the TFT array substrate 10. Thus, within the non-aperture region that is defined by the data lines 6b, the scanning lines 11 and the storage capacitors 70b, the contact holes 88 are arranged in a region, in which the extended portions 11t and 70bt are formed, as a light shielding region for further reliably reducing light leakage current in the TFTs 30. Thus, it is possible to prevent unnecessary enlargement of the width d1 of a region extending along the data line 6b or the width d2 of a region extending along the scanning line 11 or prevent additional unnecessary enlargement of portion of the non-aperture region in order to arrange the contact hole 88 only, so that a further larger aperture region may be ensured for each pixel.

In addition, the contact hole 88 is arranged so as to overlap the extended portions 11t and 70bt, light that would obliquely enter the semiconductor layer 1a from the upper layer side thereof may be further reliably blocked by the contact hole 88 (that is, portion of the capacitor line 320, formed inside the contact hole 88).

The relay layer 92b is formed in the same layer as the capacitor line 320 on the third interlayer insulating film 43.

Configuration of Sixth Layer—Pixel Electrodes 9a, Etc.—

As shown in FIG. 10, the pixel electrodes 9a are provided as the sixth layer. Each of the pixel electrodes 9a is formed on an upper layer side above the capacitor line 320 through the fourth interlayer insulating film 44.

As shown in FIG. 9 and FIG. 10, each pixel electrode 9a is electrically connected through the lower capacitor electrode 71b, the contact holes 83b, 84b, 85b and 86b, and the relay layers 91b and 92b to the pixel electrode side source/drain region 1e of the semiconductor layer 1a.

As described above, according to the liquid crystal device of the present embodiment, it is possible to enhance light shielding property for the TFTs 30 while improving the aperture ratio, and, as a result, it is possible to display a bright, high-quality image.

Third Embodiment

Figure 11:
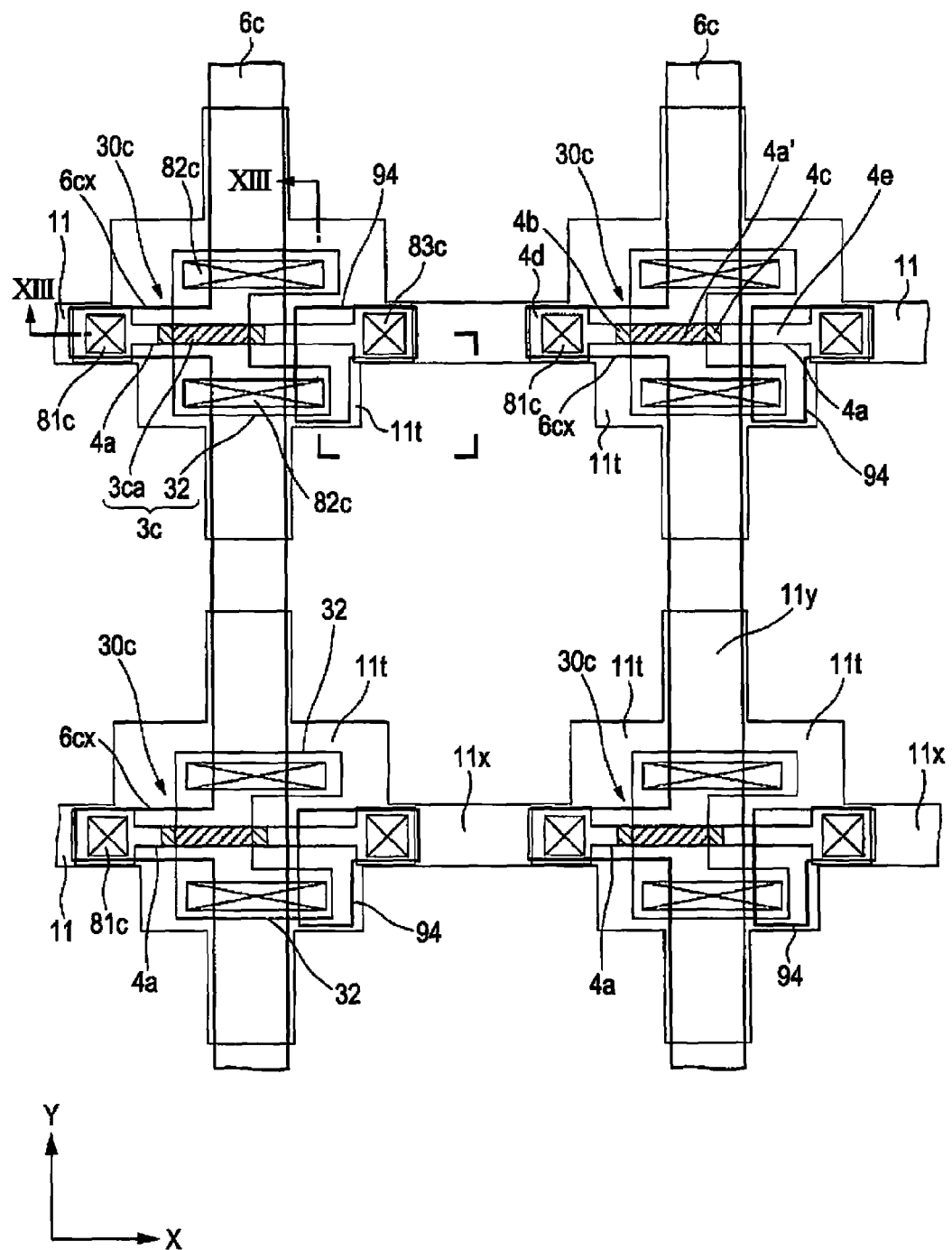
FIG. 11 is a plan view of a plurality of pixel portions (lower layer portion) according to a third embodiment.
Figure 12:
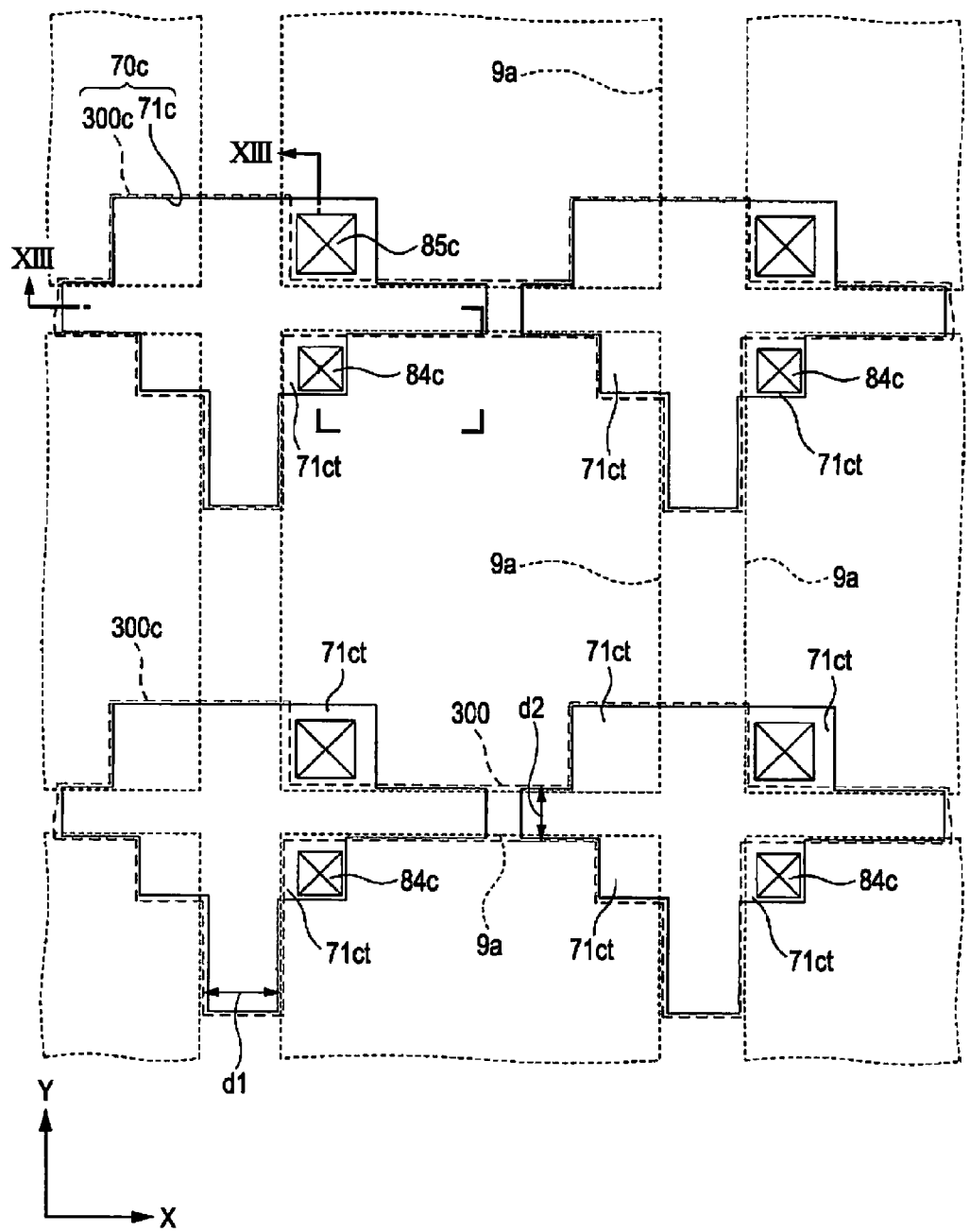
FIG. 12 is a plan view of the plurality of pixel portions (upper layer portion) according to the third embodiment.
Figure 13:
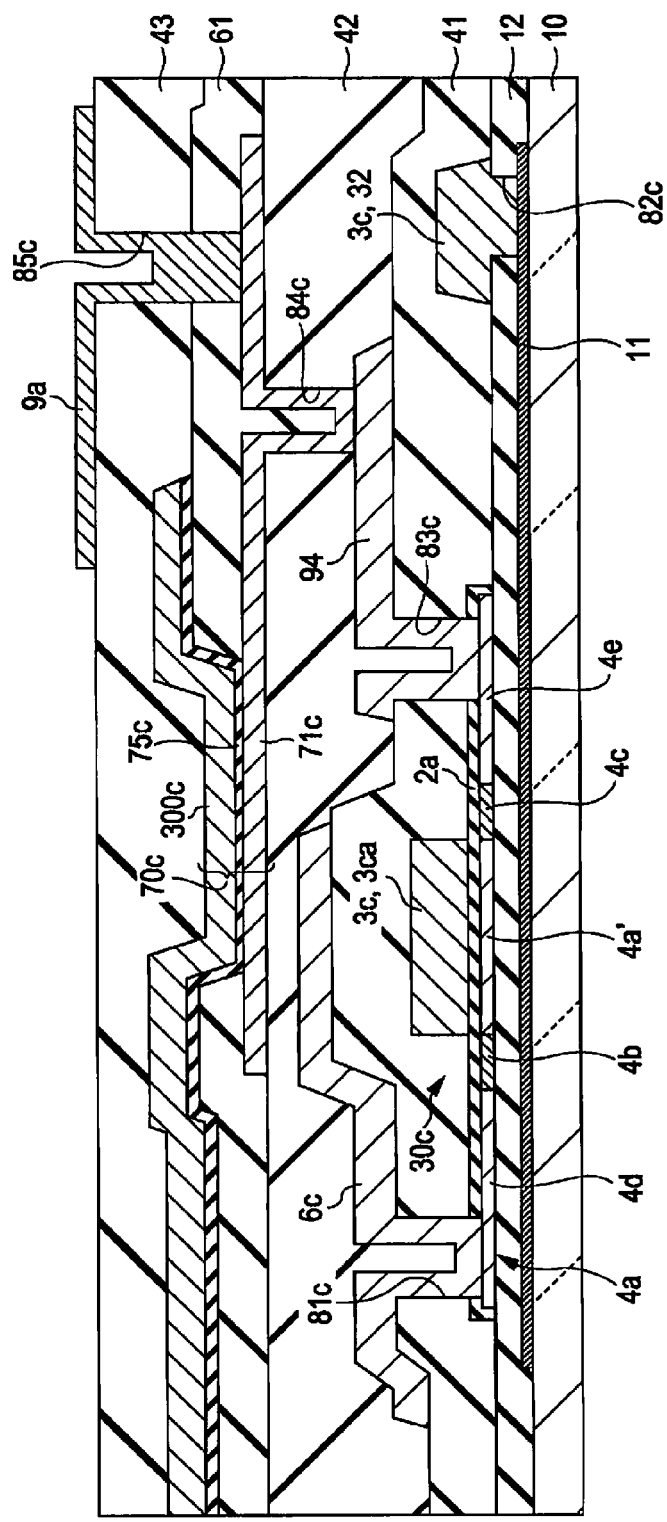
FIG. 13 is a cross-sectional view that is taken along the line XIII-XIII in FIG. 11 and FIG. 12 being superimposed.

A liquid crystal device according to a third embodiment will now be described with reference to FIG. 11 to FIG. 13. FIG. 11 and FIG. 12 are plan views of a plurality of pixel portions according to the present embodiment. FIG. 11 and FIG. 12 respectively illustrate the lower layer portion (FIG. 11) and the upper layer portion (FIG. 12) of a laminated structure, which will be described later. FIG. 13 is a cross-sectional view that is taken along the line XIII-XIII in FIG. 11 and FIG. 12 being superimposed.

Note that, in FIG. 13, in order to make it easier to recognize the layers and components in the drawings, the scale of each of the layers and components is appropriately varied. In addition, for easier description, portions located on or above the pixel electrodes 9a are not shown in FIG. 12 or FIG. 13.

Note that in FIG. 11 to FIG. 13, the same reference numerals are assigned to the similar components to those of the first embodiment shown in FIG. 1 to FIG. 7, and description thereof will be omitted appropriately.

As shown in FIG. 11 to FIG. 13, the liquid crystal device according to the third embodiment differs from the liquid crystal device of the above described first embodiment in that TFTs 30c, data lines 6c and storage capacitors 70c are provided in place of the TFTs 30, the data lines 6a and the storage capacitors 70 of the above described first embodiment, and the other portions are substantially the same as the liquid crystal device according to the above described first embodiment.

As shown in FIG. 11, the data lines 6c and the scanning lines 11 are provided respectively along the vertical and horizontal boundaries between the adjacent pixel electrodes 9a. That is, the scanning lines 11 extend along the X direction, and the data lines 6c extend along the Y direction so as to intersect with the scanning lines 11. The TFT 30 having a semiconductor layer 4a is provided at each crossover region at which the scanning line 11 and the data line 6c intersect with each other.

As shown in FIG. 11 and FIG. 12, the scanning lines 11, the data lines 6c, the storage capacitors 70c, relay layers 94 and the TFTs 30c are arranged in a non-aperture region, which surrounds aperture regions of the pixels corresponding to the pixel electrodes 9a, as viewed in plan on the TFT array substrate 10. Note that the scanning lines 11, the storage capacitors 70c and the data lines 6c respectively define portions of the non-aperture region.

As shown in FIG. 13, various components, such as the scanning line 11, the TFT 30c, the storage capacitor 70c, the data line 6c and the pixel electrode 9a, are provided on the TFT array substrate 10 so as to form a laminated structure. This laminated structure is constituted of, from the lower side, a first layer that includes the scanning lines 11, a second layer that includes the TFTs 30c having the gate electrodes 3, and the like, a third layer that includes the data lines 6c, and the like, a fourth layer that includes the storage capacitors 70c, and the like, and a fifth layer (uppermost layer) that includes the pixel electrodes 9a, and the like. In addition, a base insulating film 12 is provided between the first layer and the second layer. A first interlayer insulating film 41 is provided between the second layer and the third layer. A second interlayer insulating film 42 is provided between the third layer and the fourth layer. A third interlayer insulating film 43 is provided between the fourth layer and the fifth layer. These insulating films 12, 41, 42 and 43 prevent short circuit from occurring between the above described components. In addition, contact holes 81c, and the like, are, for example, formed in these various insulating films 12, 41, 42 and 43 and electrically connect the data line side source/drain regions 4d of the semiconductor layers 4a of the TFTs 30c to the data lines 6c. These components will now be described sequentially from the lower side. Note that, of the above described laminated structure, the first layer to the third layer are shown in FIG. 11 as a lower layer portion, and the second interlayer insulating film 42 to the fifth layer are shown in FIG. 12 as an upper layer portion.

Configuration of First Layer—Scanning Lines 11, Etc.—

As shown in FIG. 13, the scanning lines 11 are provided as the first layer. Each of the scanning lines 11 is formed as in the similar manner to the above described first embodiment and includes a main line portion 11x that extends along the X direction and projecting portions 11y that extend from the main line portion 11x to overlap the data lines 6c along the Y direction.

In the present embodiment, the extended portions 11t are provided, as in the case of the above described first embodiment. Thus, in comparison with the case in which no extended portions 11t are provided, return light that would enter the semiconductor layers 4a of the TFTs 30c may be effectively blocked by the extended portions 11t.

Configuration of Second Layer—Tfts 30c, Etc.—

As shown in FIG. 13, the TFTs 30c are provided as the second layer.

As shown in FIG. 11 and FIG. 13, each of the TFTs 30c is formed to include the semiconductor layer 4a and the gate electrode 3c.

Each of the semiconductor layers 4a is, for example, formed of polysilicon and includes a channel region 4a' having a channel length along the Y direction, a data line side LDD region 4b, a pixel electrode side LDD region 4c, a data line side source/drain region 4d and a pixel electrode side source/drain region 4e. That is, each of the TFTs 30c has an LDD structure.

The data line side source/drain region 4d and the pixel electrode side source/drain region 4e are formed in substantially mirror symmetry along the Y direction with respect to the channel region 4a'. The data line side LDD region 4b is formed between the channel region 4a' and the data line side source/drain region 4d. The pixel electrode side LDD region 4c is formed between the channel region 4a' and the pixel electrode side source/drain region 4e. The data line side LDD region 4b, the pixel electrode side LDD region 4c, the data line side source/drain region 4d and the pixel electrode side source/drain region 4e are impurity regions that are formed by implanting impurities into the semiconductor layer 4a by means of impurity implantation, such as ion implantation, for example. The data line side LDD region 4b and the pixel electrode side LDD region 4c are formed as low-concentration impurity regions that respectively have smaller impurities than the data line side source/drain region 4d and the pixel electrode side source/drain region 4e. According to the above impurity regions, while the TFT 30c is not operating, it is possible to reduce an off current that flows through the source region and the drain region and also possible to suppress a decrease in on current that flows while the TFT 30c is operating and an increase in off leakage current.

The scanning lines 11 and the semiconductor layers 4a are electrically insulated by the base insulating film 12.

As shown in FIG. 11 and FIG. 13, the gate electrodes 3c are arranged in the upper layer side above the semiconductor layers 4a through gate insulating films 2a. That is, each of the TFTs 30c is formed as a top-gate TFT. The gate electrodes 3c are, for example, formed of a light shielding conductive material, such as a high-melting point metal material that includes W, Ti, TiN, and the like. Note that the gate electrodes 3c may be, for example, formed of conductive polysilicon.

As shown in FIG. 11, each gate electrode 3c includes a main body portion 3ca that overlaps the channel region 4a' of the TFT 30c and elongated portions 32 that are elongated from the main body portion 3ca along the X direction. Each gate electrode 3c is electrically connected to the scanning line 11 through a contact hole 82c that is formed to extend through the base insulating film 12.

The contact hole 82c is formed on each side of the semiconductor layer 4a as a wall-shaped light shielding body along the X direction. Thus, it is possible to block light that would obliquely enter the semiconductor layer 4a from both sides thereof. Thus, it is possible to further reliably reduce light leakage current in the TFTs 30c.

Note that, in the present embodiment, the gate electrode 3c of each TFT 30c is separately formed; however, for example, the gate electrodes 3c of the TFTs 30c corresponding to the same scanning line 11 may be formed continuously with each other. In other words, the gate electrodes 3c of the TFTs 30c corresponding to the same scanning line 11 may be formed in another scanning line and arranged in a layer on the side opposite to the corresponding scanning line 11 with respect to the semiconductor layers 4a. In this case, the scanning line may be formed of double lines and, therefore, a scanning signal may be further reliably supplied to the gate electrodes 3c.

Configuration of Third Layer—Data Lines 6c, Etc.—

As shown in FIG. 13, the data lines 6c are provided as the third layer. In addition, in the third layer, the relay layers 94 are formed from the same film as the data lines 6c.

As shown in FIG. 11 and FIG. 13, each data line 6c includes a main line portion that extends along the Y direction and projecting portions 6cx that extend from the main line portion along the X direction. Each of the data lines 6c is electrically connected to the data line side source/drain regions 4d of the semiconductor layers 4a through the contact holes 81c, which are formed at the projecting portions 6cx so as to extend through the first interlayer insulating film 41 and the gate insulating films 2a. The data line 6c and the inside of the contact hole 81c are, for example, formed of a material that contains Al, such as Al—Si—Cu or Al—Cu, Al simple substance, or a multilayer film formed of Al layer and TiN layer. The data line 6c also has a function of shielding the TFT 30c against light.

The relay layer 94 is formed in the same layer as the data line 6c on the first interlayer insulating film 41. The relay layer 94 is electrically connected to the pixel electrode side source/drain region 4e through a contact hole 83c, which is formed to extend through the first interlayer insulating film 41 and the gate insulating film 2a, and is electrically connected to a lower capacitor electrode 71c of the storage capacitor 70c, which will be described later, through a contact hole 84c (see FIG. 12), which is formed in the second interlayer insulating film 42. Furthermore, the lower capacitor electrode 71c is electrically connected to the pixel electrode 9a through a contact hole 85c (see FIG. 12), which is formed to extend through an insulating film 61, which will be described later, and the third interlayer insulating film 43. That is, the relay layer 94, in cooperation with the lower capacitor electrode 71c, relays electrical connection between the pixel electrode side source/drain region 4e and the pixel electrode 9a.

Note that the relay layer 94 may be regarded as an example of a "first conductive film" according to the aspects of the invention, and the lower capacitor electrode 71c may be regarded as a "second conductive film" according to the aspects of the invention.

Configuration of Fourth Layer—Storage Capacitors 70c, Etc.—

As shown in FIG. 13, the storage capacitors 70c are provided as the fourth layer. Each of the storage capacitors 70c is provided on an upper layer side above the data line 6c through the second interlayer insulating film 42.

Each of the storage capacitors 70c is formed so that an upper capacitor electrode 300c and the lower capacitor electrode 71c are opposed through a dielectric film 75c. The lower capacitor electrode 71c, the dielectric film 75c and the upper capacitor electrode 300c are laminated from the lower layer side in this order.

The insulating film 61 is provided between the second interlayer insulating film 42 and the third interlayer insulating film 43 so as to be partially placed between the lower capacitor electrode 71c and the upper capacitor electrode 300c.

As shown in FIG. 12 and FIG. 13, the upper capacitor electrode 300c is formed as portion of the capacitor line 300. The capacitor line 300 extends from the image display area 10a, in which the pixel electrodes 9a are arranged, to the periphery of the image display area 10a The upper capacitor electrode 300c is a fixed-potential capacitor electrode, which is electrically connected through the capacitor line 300 to a constant-potential source and maintained at a fixed potential. The upper capacitor electrode 300c is, for example, formed of an opaque metal film that contains metal, such as Al, Ag, for example, or alloy of them, and serves as an upper side light shielding film that shields the TFT 30c. Note that, the upper capacitor electrode 300c may be, for example, formed of metal simple substance, alloy, metal silicide, or polysilicide, which contains at least one of high-melting point metals, such as Ti, Cr, W, Ta, Mo, Pd, or a laminated structure of them.

The lower capacitor electrode 71c is a pixel electric potential side capacitor electrode that is electrically connected to both the pixel electrode side source/drain region 4e of the TFT 30c and the pixel electrode 9a. More specifically, the lower capacitor electrode 71c is electrically connected to the pixel electrode side source/drain region 4e through the contact hole 84c, the relay layer 94 and the contact hole 83c, and is electrically connected to the pixel electrode 9a through the contact hole 85c. The lower capacitor electrode 71c is, for example, formed of an opaque metal film that contains metal, such as Al, Ag, for example, or alloy of them, and serves as an upper side light shielding film that shields the TFT 30c. Note that, the lower capacitor electrode 71c may be, for example, formed of metal simple substance, alloy, metal silicide, or polysilicide, which contains at least one of high-melting point metals, such as Ti, Cr, W, Ta, Mo, Pd, or a laminated structure of them.

Thus, each storage capacitor 70c has a so-called MIM structure. Hence, it is possible to reduce power consumed in the upper capacitor electrodes 300c and the lower capacitor electrodes 71c in accordance with various signals supplied to the upper capacitor electrodes 300c and the lower capacitor electrodes 71c. In addition, in comparison with the case in which any one of the upper capacitor electrode 300c and the lower capacitor electrode 71c is formed of a semiconductor film, it is possible to increase a conductance in the one of the electrodes to thereby make it possible to further improve the function of the storage capacitor 70c as a holding capacitor.

The dielectric film 75c has a monolayer structure or a multilayer structure, which is, for example, formed of a silicon oxide film, such as HTO film or LTO film, a silicon nitride film, or an insulative metal oxide, such as alumina or hafnia, or the like.

As shown in FIG. 12, particularly in the present embodiment, each lower capacitor electrode 71c has extended portions 71ct, each of which extends from a corner of an aperture region toward the center of the aperture region in a crossover region at which the scanning line 11 and the data line 6c intersect with each other. Each extended portion 71ct is formed to substantially overlap a corresponding one of the extended portions 11t, which are described with reference to FIG. 4 and FIG. 7, and to define portion of the non-aperture region. Thus, in comparison with the case in which no extended portions 71ct are provided, light that would enter the semiconductor layers 4a of the TFTs 30c from the upper layer side thereof may be effectively blocked by the extended portions 71ct. Hence, the light shielding ability for the TFTs 30c may be enhanced to thereby make it possible to further reliably reduce, for example, the occurrence of light leakage current in the TFTs 30c.

Furthermore, particularly in the present embodiment, the extended portion 71ct is formed at each of the four corners of the aperture region of each pixel. In other words, four extended portions 71ct are provided around each semiconductor layer 4a provided at the crossover region. Thus, light that would obliquely enter the semiconductor layers 4a from the upper layer side thereof may be further reliably blocked by the extended portions 71ct.

In addition, particularly in the present embodiment, the contact hole 84c that electrically connects the lower capacitor electrode 71c to the relay layer 94 is arranged so as to overlap the extended portions 11t and 70ct as viewed in plan on the TFT array substrate 10. That is, the contact hole 84c is formed in the second interlayer insulating film 42 at a position that overlaps the extended portions 11t and 71ct as viewed in plan on the TFT array substrate 10. Thus, within the non-aperture region that is defined by the data lines 6c, the scanning lines 11 and the storage capacitors 70c, the contact holes 84c are arranged in a region, in which the extended portions 11t and 70ct are formed, as a light shielding region for enhancing light shielding property for the TFTs 30c. Thus, it is possible to prevent unnecessary enlargement of the width d1 of a region extending along the data line 6c or the width d2 of a region extending along the scanning line 11 or prevent additional unnecessary enlargement of portion of the non-aperture region in order to arrange the contact hole 84c only, so that a further larger aperture region may be ensured for each pixel. That is, it is possible to improve the aperture ratio.

In addition, the contact hole 84c is arranged so as to overlap the extended portions 11t and 70ct, light that would obliquely enter the semiconductor layer 4a from the upper layer side thereof may be further reliably blocked by the contact hole 84c (that is, portion of the lower capacitor electrode 71c, formed inside the contact hole 84c).

Configuration of Fifth Layer—Pixel Electrodes 9a, Etc.—

As shown in FIG. 13, the pixel electrodes 9a are provided as the fifth layer. Each of the pixel electrodes 9a is formed on an upper layer side above the storage capacitor 70c through the third interlayer insulating film 43.

As shown in FIG. 12 and FIG. 13, each pixel electrode 9a is electrically connected to the pixel electrode side source/drain region 4e of the semiconductor layer 4a through the lower capacitor electrode 71c, the contact holes 83c, 84c and 85c and the relay layer 94.

As described above, according to the liquid crystal device of the present embodiment, it is possible to enhance light shielding property for the TFTs 30c while improving the aperture ratio, and, as a result, it is possible to display a bright, high-quality image.

Electronic Apparatus

Next, the case where the liquid crystal device, which is the above described electro-optical device, is applied to various electronic apparatuses will be described with reference to FIG. 14. Hereinafter, a projector that uses the liquid crystal device as a light valve will be described. Here, FIG. 14 is a plan view that shows a configuration example of a projector.

Figure 14:
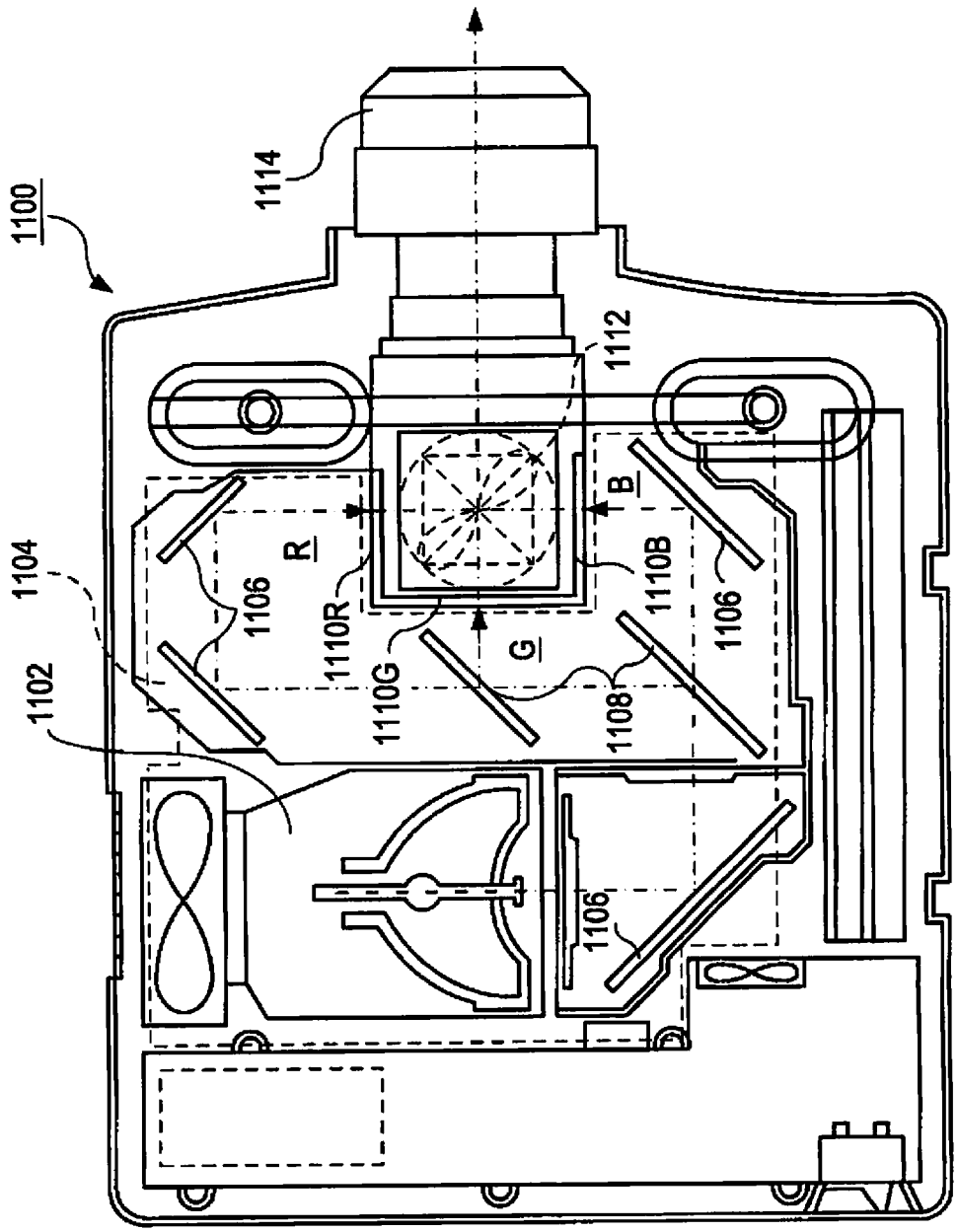
FIG. 14 is a plan view that shows the configuration of a projector, which is one example of an electronic apparatus to which the electro-optical device is applied.

As shown in FIG. 14, a projector 1100 installs therein a lamp unit 1102 formed of a white light source, such as a halogen lamp. Light projected from the lamp unit 1102 is split into three primary colors, that is, RGB, by four mirrors 1106 and two dichroic mirrors 1108, which are arranged in a light guide 1104 and then enter liquid crystal panels 1110R, 1110B and 110G, which are light valves corresponding to the primary colors.

The configurations of the liquid crystal panels 110R, 1110B and 1110G are equivalent to the above described liquid crystal device, and are respectively driven by primary color signals of R, G, B, which are supplied from an image signal processing circuit. Then, light modulated by these liquid crystal panels enters a dichroic prism 1112 from the three directions. In this dichroic prism 1112, R light and B light are refracted at a right angle while, on the other hand, G light goes straight. Thus, by composing images corresponding to the respective colors, a color image is projected onto a screen, or the like, through a projection lens 1114.

Here, focusing on display images by the liquid crystal panels 1110R, 1110B and 1110G, the display image by the liquid crystal panel 1110G needs to be mirror reversed relative to the display images of the liquid crystal panels 1110R, 1110B.

Note that, because rays of light corresponding to the primary colors of R, G, B enter the liquid crystal panels 1110R, 1110B and 1110G by the dichroic mirrors 1108, no color filter needs to be provided.

Note that, in addition to the electronic apparatus described with reference to FIG. 14, the electronic apparatus may include a mobile personal computer, a cellular phone, a liquid crystal television, a viewfinder type or a direct view type video tape recorder, a car navigation system, a pager, a personal organizer, an electronic calculator, a word processor, a workstation, a video telephone, a point-of-sales terminal, and devices provided with a touch panel. Then, of course, the aspects of the invention may be applied to the above various electronic apparatuses.

In addition, the aspects of the invention may be applied to a reflective liquid crystal device (LCOS), a plasma display (PDP), a field emission display (FED, SED), an organic EL display, a digital micromirror device (DMD), an electrophoretic device, or the like, which have elements formed on a silicon substrate, in addition to the liquid crystal device described in the above embodiments.

The invention is not limited to the above described embodiments, and may be modified into various forms without departing from the spirit and scope of the invention as described in the appended claims and specification. The scope of the invention also encompasses the thus modified electro-optical device and an electronic apparatus provided with the electro-optical device.

What is claimed is:

1. An electro-optical device comprising:
   a data line that extends along a first direction;
   a pixel electrode of which a voltage is set according to a data signal transmitted by the data line;
   a transistor that is provided at a position corresponding to the pixel electrode, the transistor including a semiconductor layer;
   a light shielding film that includes a first portion, a second portion extending along a second direction intersecting the first direction, and a third portion connected to the first portion and the second portion, the first portion overlapping the data line, the second portion not overlapping the data line, the third portion having a length along the first direction larger than a length of the second portion along the first direction, the third portion overlapping a channel region of the semiconductor layer, the third portion having a base part that is connected to the second portion and an extended part that is connected to the base part and that extends from the base part along the first direction, and the base part having a length along the first direction equal to the length of the second portion along the first direction;
   a first conductive film that overlaps the light shielding film and that is located between the pixel electrode and the semiconductor layer;
   a second conductive film that overlaps the light shielding film, the second conductive film being formed between the first conductive film and the pixel electrode; and
   an interlayer insulating film between the first conductive film and the second conductive film, the first conductive film and the second conductive film being electrically connected through a contact hole formed in the interlayer insulating film, the contact hole overlapping at least a part of the extended part of the third portion as viewed in plan.

2. The electro-optical device according to claim 1, wherein the third portion of the light shielding film is formed at each of four corners of a pixel.

3. The electro-optical device according to claim 1, wherein the second conductive film includes a metal film and has a portion that is formed inside the contact hole.

4. The electro-optical device according to claim 1, wherein the light shielding film includes a lower capacitor electrode and an upper capacitor electrode that are sequentially laminated from a lower layer side on a substrate, and wherein
   one electrode out of the lower capacitor electrode and the upper capacitor electrode is a capacitive element that is electrically connected to the pixel electrode.

5. The electro-optical device according to claim 4, wherein the first conductive film is formed as the one electrode and is electrically connected to the semiconductor layer, and wherein
   the second conductive film is electrically connected to the pixel electrode.

6. The electro-optical device according to claim 4, further comprising:
   a capacitor line that is formed on an upper layer side above the capacitive element and the second conductive film and that is electrically connected to the other electrode different from the one electrode out of the lower capacitor electrode and the upper capacitor electrode, wherein
   the first conductive film is formed as the other electrode, and wherein
   the second conductive film is electrically connected to the capacitor line.

7. The electro-optical device according to claim 4, wherein the second conductive film is formed as a capacitor line that is electrically connected to the other electrode different from the one electrode out of the lower capacitor electrode and the upper capacitor electrode, and wherein
   the first conductive film is electrically connected to the other electrode.

8. The electro-optical device according to claim 4, wherein the first conductive film is electrically connected to the semiconductor layer, and wherein
   the second conductive film is the one electrode that is electrically connected to the pixel electrode.

9. The electro-optical device according to claim 4, wherein each of the upper capacitor electrode and the lower capacitor electrode is formed of a metal film.

10. An electronic apparatus comprising the electro-optical device according to claim 1.

11. An electro-optical device comprising:
a data line that extends along a first direction;
a pixel electrode of which a voltage is set according to a data signal transmitted by the data line;
a transistor that is provided at a position corresponding to the pixel electrode, the transistor including a semiconductor layer;
a light shielding film that includes a first portion, a second portion that extends along a second direction intersecting the first direction, and a third portion connected to the first portion and the second portion, the first portion overlapping the data line, the second portion not overlapping the data line, the third portion having a length along the first direction larger than a length of the second portion along the first direction, the third portion overlapping a channel region of the semiconductor layer, the third portion having a base part that is connected to the second portion and an extended part that is connected to the base part and that extends from the base part along the first direction, and the base part having a length along the first direction equal to the length of the second portion along the first direction;
a first conductive film that overlaps the light shielding film, the first conductive film being located between the pixel electrode and the semiconductor layer; and
an interlayer insulating film that is located between the pixel electrode and the first conductive film, the pixel electrode and the first conductive film being electrically connected through a contact hole formed in the interlayer insulating film, the contact hole overlapping at least a part of the extended part of the third portion as viewed in plan.

12. The electro-optical device according to claim 1, wherein the extended part of the third portion is connected to the first portion.

13. The electro-optical device according to claim 11, wherein the extended part of the third portion is connected to the first portion.

14. An electro-optical device comprising:
a data line that extends along a first direction;
a pixel electrode of which a voltage is set according to a data signal transmitted by the data line;
a transistor that is provided at a position corresponding to the transistor, the transistor including a semiconductor layer;
a light shielding film that includes a first portion extending along the first direction, a second portion, and a third portion connected to the first portion and the second portion, the first portion overlapping the data line, the second portion not overlapping the data line, the third portion having a length along a second direction intersecting the first direction larger than a length of the first portion along the second direction, the third portion overlapping a channel region of the semiconductor layer, and the third portion having a base part that is connected to the first portion and an extended part that is connected to the base part and that extends from the base part along the second direction, the base part having a length along the second direction equal to the length of the first portion along the second direction;
a first conductive film that overlaps the light shielding film and that is located between the pixel electrode and the semiconductor layer;
a second conductive film that overlaps the light shielding film, the second conductive film being formed between the first conductive film and the pixel electrode; and
an interlayer insulating film between the first conductive film and the second conductive film, the first conductive film and the second conductive film being electrically connected through a contact hole formed in the interlayer insulating film, the contact hole overlapping at least a part of the extended part of the third portion as viewed in plan.

15. An electro-optical device comprising:
a data line that extends along a first direction;
a pixel electrode of which a voltage is set according to a data signal transmitted by the data line;
a transistor that is provided at a position corresponding to the transistor, the transistor including a semiconductor layer;
a light shielding film that includes a first portion extending along the first direction, a second portion, and a third portion connected to the first portion and the second portion, the first portion overlapping the data line, the second portion not overlapping the data line, the third portion having a length along a second direction intersecting the first direction larger than a length of the first portion along the second direction, the third portion overlapping a channel region of the semiconductor layer, the third portion having a base part that is connected to the first portion and an extended part that is connected to the base part and that extends from the base part along the second direction, and the base part having a length along the second direction equal to the length of the first portion along the second direction;
a first conductive film that overlaps the light shielding film, the first conductive film being located between the pixel electrode and the semiconductor layer; and
an interlayer insulating film that is located between the pixel electrode and the first conductive film, the pixel electrode and the first conductive film being electrically connected through a contact hole formed in the interlayer insulating film, the contact hole overlapping at least a part of the extended part of the third portion as viewed in plan.

16. The electro-optical device according to claim 11, wherein a scan signal is transmitted through the light shielding film.

17. The electro-optical device according to claim 15, wherein a scan signal is transmitted through the light shielding film.

* * * * *